United States Patent [19]
Laursen et al.

[11] Patent Number: 5,805,804
[45] Date of Patent: Sep. 8, 1998

[54] METHOD AND APPARATUS FOR SCALABLE, HIGH BANDWIDTH STORAGE RETRIEVAL AND TRANSPORTATION OF MULTIMEDIA DATA ON A NETWORK

[75] Inventors: Andrew Laursen, San Mateo; Jeffrey C. Olkin, Sunnyvale; Mark A. Porter, Woodside; Farzad Nazem, Redwood City; William Bailey, Palo Alto; Mark Moore, Foster City, all of Calif.

[73] Assignee: Oracle Corporation, Redwood Shores, Calif.

[21] Appl. No.: 816,207

[22] Filed: Mar. 12, 1997

Related U.S. Application Data

[63] Continuation of Ser. No. 343,762, Nov. 21, 1994, abandoned.

[51] Int. Cl.[6] ............................................... G06F 13/00
[52] U.S. Cl. .............. 395/200.02; 395/154; 395/200.02; 395/200.15; 370/397; 348/7
[58] Field of Search .................... 395/200, 600, 395/200.02–200.15; 370/58, 62, 94, 60.4, 397; 348/7–10

[56] References Cited

U.S. PATENT DOCUMENTS

| | | | |
|---|---|---|---|
| 4,642,758 | 2/1987 | Teng | 364/200 |
| 4,985,887 | 1/1991 | Mizuhara et al. | 370/384 |
| 5,014,125 | 5/1991 | Pocock et al. | 356/86 |
| 5,195,086 | 3/1993 | Baumgartner et al. | 370/62 |
| 5,208,811 | 5/1993 | Kashio et al. | 370/401 |
| 5,379,441 | 1/1995 | Watanabe | 395/800 |
| 5,412,416 | 5/1995 | Nemirofsky | 348/10 |
| 5,420,867 | 5/1995 | Price et al. | 370/524 |
| 5,426,747 | 6/1995 | Weinreb | 395/600 |
| 5,426,773 | 6/1995 | Chabanet et al. | 395/575 |
| 5,442,771 | 8/1995 | Filepp et al. | 395/650 |
| 5,457,680 | 10/1995 | Kamm et al. | 370/17 |
| 5,488,412 | 1/1996 | Majeti et al. | 348/10 |
| 5,499,343 | 3/1996 | Pettus | 395/200.2 |
| 5,517,622 | 5/1996 | Ivanoff et al. | 395/200.13 |
| 5,539,449 | 7/1996 | Blahut et al. | 348/7 |
| 5,548,726 | 8/1996 | Pettus | 395/200.09 |
| 5,548,729 | 8/1996 | Akiyoshi et al. | 395/200.16 |
| 5,555,244 | 9/1996 | Gupta et al. | 370/397 |
| 5,555,378 | 9/1996 | Gelman et al. | 395/200.13 |
| 5,560,005 | 9/1996 | Hoover et al. | 395/600 |
| 5,594,789 | 1/1997 | Seazholtz et al. | 379/207 |
| 5,608,447 | 3/1997 | Farry et al. | 348/7 |
| 5,621,728 | 4/1997 | Lightfoot et al. | 370/397 |
| 5,625,404 | 4/1997 | Grady et al. | 348/7 |
| 5,629,732 | 5/1997 | Moskowitz et al. | 348/7 |

FOREIGN PATENT DOCUMENTS

| | | | |
|---|---|---|---|
| 0332148 | 9/1989 | European Pat. Off. | G06F 9/46 |
| 0529864 | 3/1991 | European Pat. Off. | G06F 15/16 |
| 9401964 | 1/1994 | WIPO | H04N 1/00 |
| 9512947 | 5/1995 | WIPO | H04L 29/06 |

OTHER PUBLICATIONS

IBM Almaden Research Center, The Shark Continuous–Media File Server, Roger L. Haskin.

IBM Almaden Research Center, A System for the Delivery of Interactive Television Programming, Roger L. Haskin and Frank L. Stein from the IBM Network Application Systems.

*Primary Examiner*—Christopher B. Shin
*Attorney, Agent, or Firm*—Blakely, Sokoloff Taylor & Zafman

[57] ABSTRACT

An improved system and method for providing multimedia data in a networked system is disclosed. The present invention provides a platform for distributed client-server computing and access to data over asymmetric real-time networks. A service mechanism allows applications to be split such that client devices (set-top boxes, personal digital assistants, etc.) can focus on presentation, while backend services running in a distributed server complex, provide access to data via messaging across an abstracted interface.

14 Claims, 15 Drawing Sheets

CONNECTION SERVICE TABLE
320

| UPSTREAM MANAGER PHYSICAL ADDRESS 410 | CLIENT LOGICAL ADDRESS 412 | DOWNSTREAM MANAGER PHYSICAL ADDRESS 414 | DOWNSTREAM MANAGER LOGICAL ADDRESS 416 | DOWNSTREAM CLIENT PHYSICAL ADDRESS 418 |
|---|---|---|---|---|

*FIG. 7*

ROUTING TABLE
310

| DOWNSTREAM LOGICAL ADDRESS 420 | DOWNSTREAM PHYSICAL ADDRESS 422 |
|---|---|

*FIG. 8*

METHOD AND APPARATUS FOR SCALABLE, HIGH BANDWIDTH STORAGE RETRIEVAL AND TRANSPORTATION OF MULTIMEDIA DATA ON A NETWORK

This is a continuation of application Ser. No. 08/343,762, filed Nov. 21, 1994, now abandoned.

FIELD OF THE INVENTION

The present invention relates to the field of information storage and transport systems. Specifically, the present invention relates to distributed processing systems for selecting, retrieving, and delivering arbitrary types of real-time or non-real-time data streams over a network.

REFERENCE TO RELATED PATENT APPLICATIONS

The following co-pending patent applications are related:

U.S. Patent Application entitled "Method and Apparatus for Indexing Multimedia Information Streams" invented by Evan Goldberg, et al., with Ser. No. 08/342,422 and filed on Nov. 18th, 1994, issued U.S. Pat. No. 5,655,119.

U.S. Patent Application entitled "Transferring Binary Large Objects (BLOBS) in a Network Environment" invented by Jeffrey C. Olkin, et al., with Ser. No. 08/343,092 and filed on Nov. 21st, 1994.

U.S. Patent Application entitled "A Reliable Connectionless Network Protocol" invented by Jeffrey C. Olkin, with Ser. No. 08/343,761 and filed on Nov. 21st, 1994.

DESCRIPTION OF RELATED ART

Currently, most data accessed on large servers is structured data stored in traditional databases. Networks are local area network (LAN) based and clients range from simple terminals to powerful workstations. The user is corporate and the application developer is an MIS professional.

With the introduction of broadband communications to the home and better than 100-to-1 data compression techniques, a new form of network-based computing is emerging. Structured data is still important; but, the bulk of data becomes unstructured: audio, video, news feeds, etc. The predominant user or client becomes the consumer. The predominant client device becomes the television set. The application developer becomes the storyboard developer, director, or the video production engineer.

Simple, affordable access to multimedia information is both an enormous business opportunity and a powerful vehicle for people to change the way they live and work. Whether in the realm of shopping, news, movies, education or other applications, consumer multimedia will make obsolete much of what we know about storing, retrieving, and processing information.

Providing information to consumers on a large scale presents many challenges. Ultimately, providers of information must find profitable means to reach price points that will drive demand, keep pace with technology, deliver simple access to computerphobic consumers, and deliver a robust architecture that allows the systems to evolve and grow.

The last decade of computing has produced inexpensive client hardware with shrink-wrapped software, scalable server hardware with complex data management software, and ubiquitous heterogeneous networking hardware with sophisticated networking software. However, the promise that multimedia data will be readily shared and easy to access has been mostly unfulfilled. Most conventional multimedia software is single user and fairly easy to use or it allows resources to be shared but the degree of sharing extracts a correspondingly high price in usability. Consumer-based interactive networking is an attempt to provide simple access to unprecedented amounts of shared data. The present invention provides a framework for such an endeavor.

Thus, a better means and method for storing, retrieving and transporting multimedia data in a networked system is needed.

SUMMARY OF THE INVENTION

The present invention is a better means and method for providing multimedia data in a networked system. The present invention provides a platform for distributed client-server computing and access to data over asymmetric real-time networks. A service mechanism allows applications to be split such that client devices (set-top boxes, personal digital assistants, etc.) can focus on presentation, while backend services running in a distributed server complex, provide access to data via messaging across an abstracted interface. Services enable clients to access data or resources that the clients cannot (or should not) access directly. Each service provides access to a particular type of data or resources. A service exports one or more functions, which perform specific actions related to the data or resource. A client program invokes a function by communicating with the service that exports that function.

The present invention supports access to all types of conventional data stored in conventional relational and text databases. In addition, the present invention includes a real-time stream server that supports storage and playback of real-time audio and video data. The Media Server of the present invention also provides access to data stored in file systems or as binary large objects (BLOBs-images, executables, etc.).

BRIEF DESCRIPTION OF THE DRAWINGS

FIG. 7 illustrates the content of the Connection Service Table.

FIG. 8 illustrates the content of the Routing Table.

DETAILED DESCRIPTION OF THE PREFERRED EMBODIMENT

The present invention is a better means and method for providing multimedia data in a networked system. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
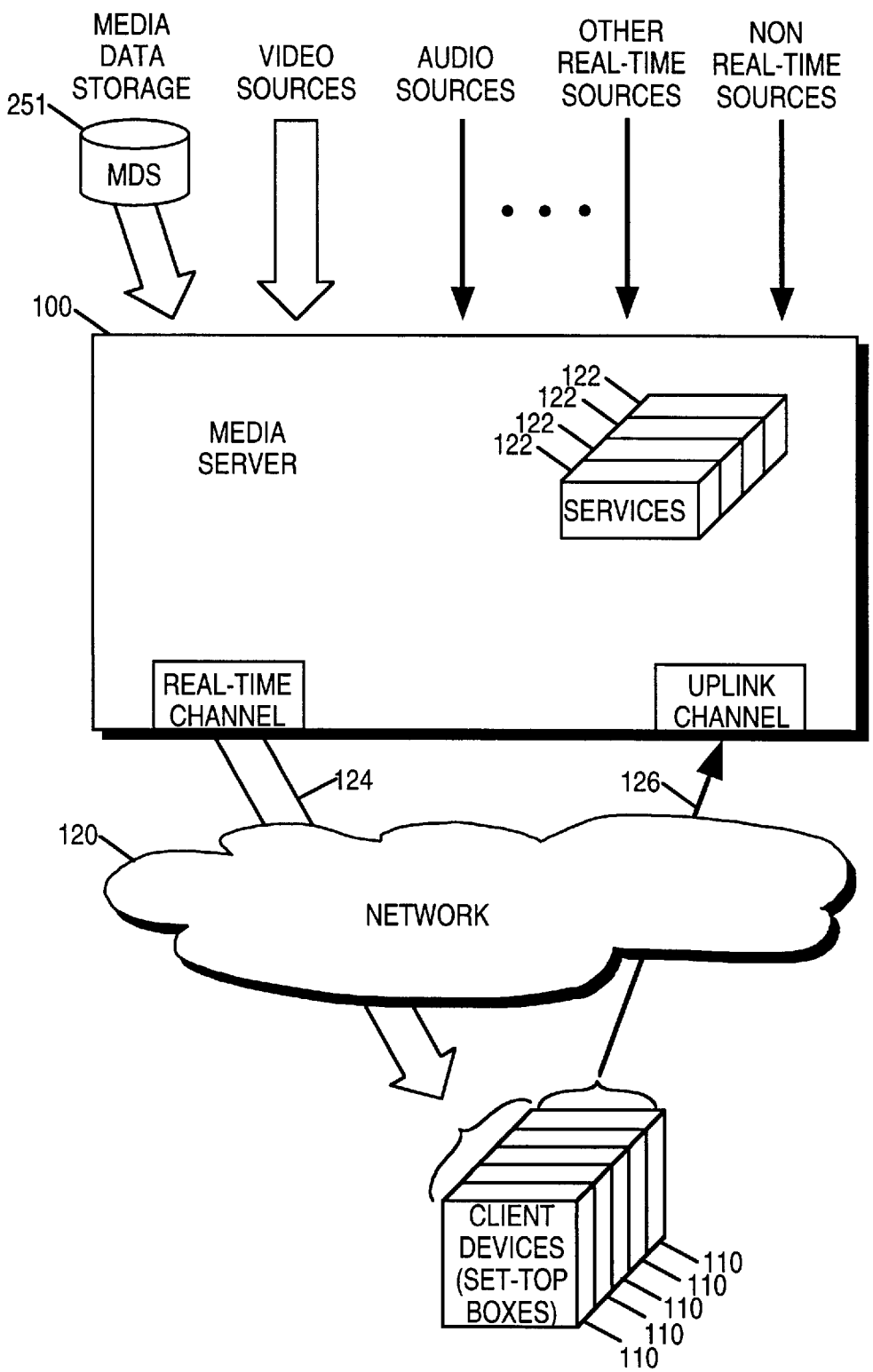
FIG. 1 illustrates the system architecture of the present invention.

The basic architectural components of the consumer-based interactive network architecture of the present invention is illustrated in FIG. 1. The media server 100 consists of any number of computers networked in any fashion. The network 120 connecting clients 110 and servers 100 are asymmetric, with high bandwidth available in the downstream direction 124. Client devices 110 are conventional and well known systems generally built for interactive TV. These client devices are generically denoted set-top boxes. Other classes of devices (personal digital assistants, video phones, etc.) will become important to consumer-based networks in the near future. The present invention supports these devices as well.

Networks

The major characteristic shared by the networks currently being deployed for interactive TV is asymmetric bandwidth. Downstream bandwidth (i.e. the link from server to client device) ranges from a minimum of 1.5 megabits/sec (DS1 data rates) to 45 megabits/sec (DS3 data rates). Upstream bandwidth on a back channel (i.e. the link from client device to server) may be more modest, ranging from 9600 bits/sec to 64 kilobits/sec. Bandwidth will increase in both directions, but will probably remain highly asymmetric; because, most information flows toward the consumer.

Three types of conventional physical data transport techniques provide the foundation for three types of networks supported by the present invention. It will be apparent to those of ordinary skill in the art that other networks can be supported as well by the present invention.

ADSL (Asymmetric Digital Subscriber Loop) provides 1.5–6 megabits/sec of downstream bandwidth—up to 64 kilobits/sec in the opposite direction—over a twisted pair of copper wires. The maximum distance achieved to date is 6,000 meters. This technology provides broadband capability to millions of consumers over their existing phone lines.

Coaxial cable promises to provide 500 channels. Cable provides 450–1000 megahertz of bandwidth. State of the art radio frequency (RF) modulation technology provides up to 8 bits per hertz. A typical cable plant buildout for interactive TV will provide back channel bandwidth in the 5–50 megahertz range, with the rest dedicated to single user downstream channels in the 3–12 megabit/sec range. Thus, each interactive user (client) is allocated a virtual downstream channel in the high frequency spectrum and a corresponding back channel in the low frequency spectrum. The downstream channel is typically a time-division multiplexed bit stream modulated over an analog channel (6 Mhz for NTSC and 8 Mhz for PAL). There are, of course, many ways to allocate and modulate the available bandwidth and capacity can be greatly increased with the addition of fiber.

ATM (Asynchronous Transfer Mode) to the home over fiber/coax hybrid networks provides maximum flexibility for both bandwidth and addressing. ATM technology is well known in the art. Because ATM provides dynamic allocation of bandwidth, it is possible to provide variable bandwidth bit streams using ATM. Thus, it is possible to serve movies at 3 megabits/sec, sporting events encoded in real-time at 8 megabits/sec, and HDTV compressed at 20 megabits/sec (or whatever bandwidth is required). ATM also provides flexibility at the headend since many servers can be directly connected into the ATM switch fabric at very high bandwidth; 155 megabit/sec is available today, increasing to 622 megabits/sec or 1.2 gigabits/sec over time.

Another important network characteristic is latency. In today's systems, a message may take more than a second for a round trip. Back channels are slow, multiple hops are often required, and return values (bit maps, executables, etc.) are often large. Applications must be designed with these latencies in mind.

The transport protocol over the network 120 depends on the direction of travel. Upstream, the transport may be X.25; UDP, RS232, or other well known protocol. Downstream, the transport may be MPEG-2 (Motion Picture Experts Group) transport packets, MPEG-1 bit streams, UDP packets, or another well known high-speed protocol.

Compression

Video compression technology reduces large bandwidth video data to rates that can be supported by the interactive networks. Just as the new networks provide the essential hardware technology for interactive deployment, new methods of video and audio compression are the essential software technology.

Although, studio-quality digital tape drives deliver more than 200 megabits per second, a typical home wired for interactive service will have only 1.5–6 megabits per second of downstream bandwidth. Thus, content must be compressed at over 100:1 to enable transport over the network. This high rate of compression cannot be achieved without encoding loss; some data must be thrown away. Conventional compression-decompression algorithms (codecs) differ in how they choose the data to throw away and the data to keep. Well known compression schemes, for instance JPEG (Joint Photographic Experts Group), apply frequency transformations, such as DCT (discrete cosine transform), to the data, which take advantage of spatial redundancy (adjacent pixels tend to be similar). Unfortunately, in order to produce a picture of comparable quality to a VHS VCR, JPEG bit rates of at least 4 megabits/sec must be used. This rate is too high for the low end of the standard network delivery bandwidth.

Fortunately, a video stream also has large amounts of temporal redundancy (adjacent frames are the same or similar). Compression algorithms such as MPEG-1 (Motion Pictures Experts Group) and MPEG-2 take this redundancy into account and compress it out of the data. Carefully compressed movie footage using MPEG-1 at 1.5 megabits/second is comparable in quality to a VHS VCR. At bit rates of around 4 megabits/sec, MPEG-2 is comparable to a laser disk. At data rates of 6–8 megabits per second (within reach of both ADSL and cable coaxial systems), the video quality is better than laser disk.

While video compression benefits from both temporal and spatial redundancy, audio compression does not. Thus, the audio compression achieved for CD-quality sound is only around 7:1 (compared to greater than 100:1 for video).

Digitally compressed video has many advantages over traditional analog video. For example, it provides play-through compatibility between disparate standards such as PAL and NTSC, perfect frame stills, and perfect multi-generation reproduction of master content. Digital compression offers features that are impossible with analog recordings, such as MPEG-2's scalability enhancements which allow users to pan across large pictures, and even zoom in on features, with an increase in detail.

Digital compression has disadvantages as well. By compressing the temporal redundancy from a stream, the resulting single frame of compressed video is no longer self-describing, relying on nearby frames to completely reconstruct its contents. This makes random access in to the middle of a stream difficult: the jump can only be made to well-defined access points, of which there are typically 1–3 per second. This inter-frame dependency also makes it difficult to edit compressed video. Finally, because of the complexity involved in determining the dependencies between frames, it is very difficult to compress video in real-time. Though real-time video encoders exist today, they are expensive and not likely to break into the consumer market soon. In the meantime, video conferences from the home will be limited to the use of existing picture-phone technology. Note, however, that real-time decompression is simpler and can be accomplished by a single chip.

Fractal compression is a proprietary video compression technology that relies on the inherent duplication of basic shapes in pictures. Though currently still in the research stage, this technology promises very good compression ratios for certain types of data. Fractal compression does not eliminate inter-frame temporal redundancy, and thus does not have any of the drawbacks mentioned above. Computationally, however, it is very expensive.

There are other conventional compression-decompression algorithms such as TrueMotion and Indeo Video. Since large vendors are justifiably hesitant to use proprietary codecs, telephone and cable companies are supporting the MPEG algorithms to the exclusion of all other compression technologies. Eventually, the industry will settle on an envelope protocol that will transport any compressed digital data, regardless of format. This envelope format may be MPEG-2 transport, or a hypermedia format such as MHEG or Hytime or it may be something not yet invented.

Even though digital media compression enables real-time stream delivery over the bandwidth available in current networks, it is not a "throw-away" technology. As network bandwidth increases, it still makes sense to continue to compress the video and audio, and use the spare bandwidth to carry more information (simultaneous data with video, multi-way video conferencing, etc.).

Thus, integrating video compression into the heart of the Media Server is essential. The present invention accomplishes this by having the Stream Service 224 generate and manipulate the real-time audio/video data as it served to the downstream manager. This includes identification and modification of the data structures (headers, pictures, aspect ratios, etc.) in the original data in real-time.

Client Devices

Referring again to FIG. 1, the client device or set-top box 10 is a device that combines the functionality of current analog cable converter boxes (tuning and descrambling) with the functionality of computers (navigation, interaction and display). The current generation of conventional set-top boxes have four major components: a network interface, an MPEG decoder, graphics overlay, and a presentation engine.

The network interface provides both downstream and upstream interfaces over one or more physical connections.

The decoder converts MPEG encoded data into audio and video. In addition, the MPEG subsystem may demultiplex application and control data from an MPEG transport stream.

The graphics overlay provides at least one graphics plane, bitmap operations, and optional chromakey mixing, a well known technique.

The presentation engine consists of a CPU, at least two megabytes of memory, and a real-time operating system. The client portion of the application runs in this subsystem of the client device 110. In the preferred embodiment, the application is controlled through the use of a simple remote control device with buttons or a joystick.

In order for interactive consumer systems to be widely deployed, vendors are targeting such set-top boxes 110 in the $200–$400 price range, and thus comparable in price to a low-end VCR. While vendors are currently building entry-level set-top boxes, higher end systems are envisioned, with better graphics capability, high speed printers, graphics and video capture, and perhaps keyboards for advanced users. Ultimately, the entire range of set-top boxes will be distributed as consumer devices, just as VCR's, video game players and TVs are today.

Data Types

Unlike most corporate data, the data being managed in these systems is mostly read-only. The data that is changeable is inherently partitionable (consumer preferences, PINs, etc.) or append-only data (billing records, usage data, etc.). The amount of accessible data is several orders of magnitude greater than that contained in corporate databases today.

The types of data that must be accessible to consumers through client devices 110 include: isochronous, textual, structured, and binary large objects.

Isochronous data is what comes to mind when the term multimedia is used. Films, television, and music will be on-line and available on demand using the present invention. The main attribute of this type of data is that it is too large to simply download and store. It must be delivered in real-time with minimal buffering. Real-time delivery of audio and video is necessary for the success of consumer based networks, but certainly not sufficient.

On-line textual databases will provide access to many terabytes of data, from live news feeds to current novels to popular magazines. One major problem is to navigate and search this sea of text using devices that have no keyboards. The present invention has the ability to reduce and abstract text which will help reduce the amount of text that must be initially displayed.

Binary large objects (BLOBS) are used in the present invention to store many kinds of information, from images to application logic as stored in scripts. The same transport (with the addition of forward error correction) that is utilized for isochronous data is ideal for BLOBS.

Structured data, as stored in a relational database, is used much as it is today in corporate databases, to provide flexible access and to ensure integrity. Very large objects, isochronous and textual data will be inefficient if stored in conventional relational databases due to the way the data is searched and accessed. For example, an MPEG-encoded movie would not be stored in relational database but all its attributes (director, leading actors, price, etc.) would be.

In view of these prior art subsystems and the need to support an additional level of functionality, the media server 100 and the supporting network layer of the present invention provides a full-featured system for interactive multimedia presentations.

The Architecture of the Media Server of the Present Invention

The present invention provides a layer of software that enables distributed client-server computing in the consumer-based networks described above. The main components of the present invention include:

a service infrastructure comprehensive set of services access to data a real-time stream server messaging and remote procedure calls (RPC) via the network protocol of the present invention.

Figure 2:
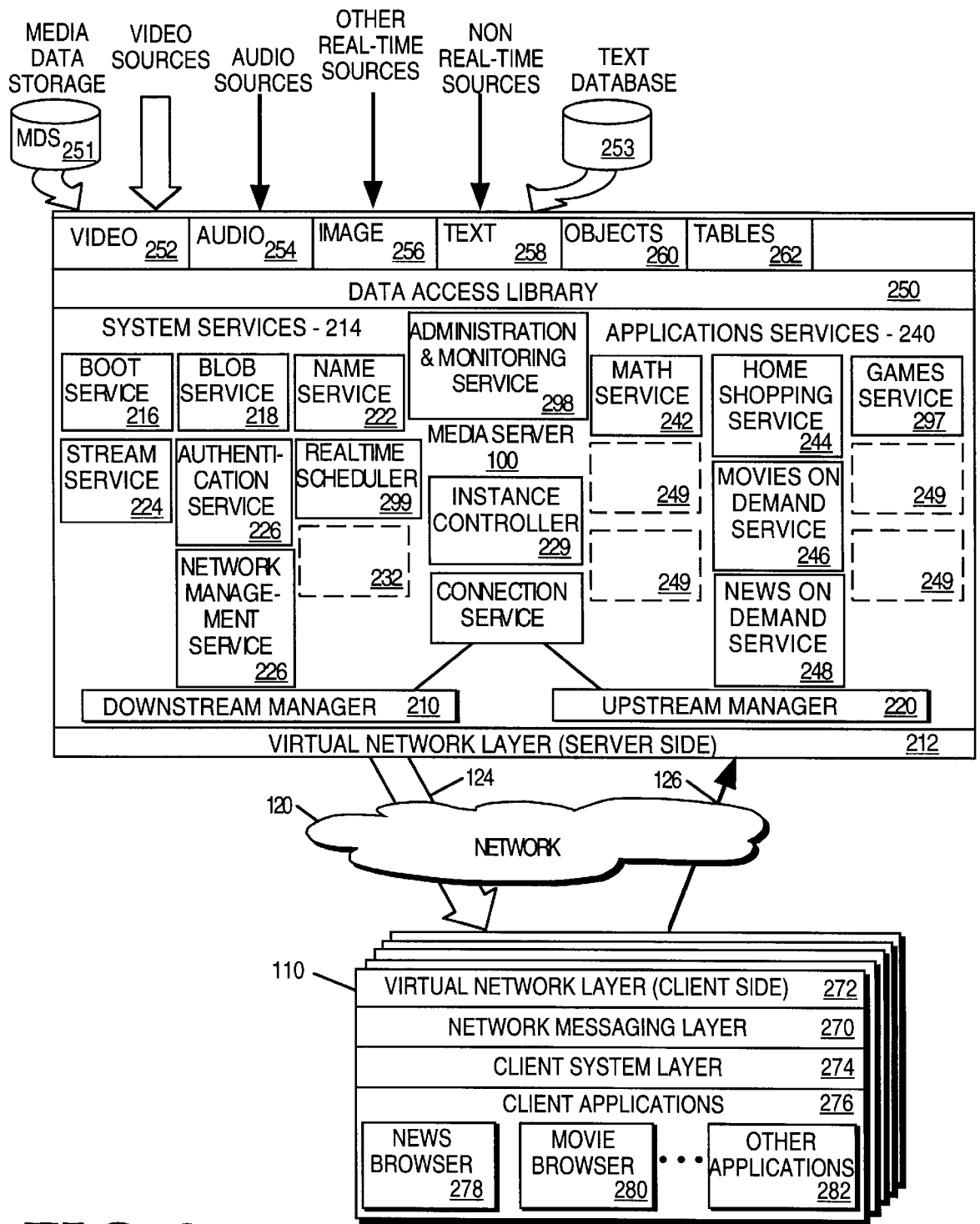
FIG. 2 illustrates the internal architecture of the media server of the present invention.

Referring now to FIG. 1 and FIG. 2, the architecture of the present invention assumes that data is stored and managed on the server 100 and the client device 110 provides a view onto that data. Generally, the view is through some paradigm such as a digital mail, personal digital assistant, or electronic newspaper. The user navigates locally on the client device 110 and data is requested from the server 100 as necessary. This provides a very clean split between the client side of the application and the server side.

Server applications (services) 122 are "data based" and developed with the same tools used to build corporate databases (i.e. data modeling tools, schema editors, etc.). These services must be built in a reliable and scalable manner.

Client applications 276, shown in FIG. 2, are built using interactive, graphical authoring tools that allow digital assets (video, images, sounds, etc.) to be mixed with presentation logic to produce a runtime environment for interactive TV. The present invention supports runtime environments by providing such services as application download, asset management, authorization, and stream interaction (as will be described below). Typically, there are many more client applications built than those for the server 100. For instance, there may be three home shopping services nationwide that are used by hundreds of client applications.

Because latency is a major issue in the network 120 as described earlier, the architecture of the present invention allows distributed applications to be built where all state information is maintained on the client device 110. The use of remote procedure calls (RPC) to access services and data through the media server 100 is preferred over the use of a traditional Structured Query Language (SQL) for data access. This is because it reduces the number of round-trip messages and provides easy to use interfaces to application services.

Service Infrastructure

FIG. 1 shows a plurality of available services 122 on media server 100. FIG. 2 shows examples of these services and shows in more detail how these services can be partitioned into applications services 240 and system services 214. However, in reality, this partitioning is purely arbitrary. Any of the services 240 or 214 are accessible to a client on client device 110 or accessible to another service on server 100.

Each service 122 as shown in FIG. 1 comprises one or more cooperating server execution threads which may be distributed across several machines. Load balancing across these server threads is performed by server 100 dynamically and transparently to the client. Requests sent by a client are routed to a service control point which decides, based on current system activity, which server process can actually handle the request. The service control points support many server threads before they become bottlenecks. Still, because these systems must be highly scalable, service control points may be replicated. For example, the name service 222, which is used to locate all other servers, must be replicated in order to handle the large numbers of requests sent to it.

To shield client applications from network implementation details, client applications never interact directly with the underlying databases. Instead, all applications developed with the media server 100 communicate with services by sending messages locally or remotely.

Interfaces to the services are defined using an interface definition language (IDL). A service interface consists of a set of operations that define what the service can do. Once created, the interface definition is compiled to generate stubs which isolate the distributed nature of the system from the computations being performed. Client applications 276 execute the operations by making remote procedure calls (RPC) to the server 100. The use of RPC in the present invention is described in more detail below. In addition to providing its base functionality to client applications 276, each service 214 and 240 has a standard interface for configuration, management, monitoring, debugging, logging and auditing.

Access to Data

Whereas client applications 276 access data via RPC's to services, services access data via a set of access libraries to the various data repositories:

Isochronous data is stored in the Media Data Store (MDS) 251, a real-time striped file system that allows concurrent, random access to video and audio data. The interface allows media streams to be positioned and played. All attributes describing the streams (title, content description, compression format, etc.) are stored as structured data in a conventional database.

Textual data is stored in the conventional Text database 253, shown in FIG. 2, as a set of indexed documents. The interface allows documents to be searched by words, phrases, and even concepts. The ability to abstract text is provided by a conventional product that can parse and interpret English text using a sophisticated lexicon and 50,000 parse rules.

Binary Large Objects are stored as opaque data types in either the Text database 253 or in the Media Data Store 251. As with isochronous data, all attributes of the BLOBS are stored as structured data.

Structured data is stored in the Text database 253 and accessed via SQL and PL/SQL (Procedural Language/ SQL). Text database 253 provides distribution, replication, and parallel access to the data. Stored procedures, executing within the protected space of the database environment, provide an excellent mechanism for building reliable services. A server application in this model consists of a schema and a set of procedures to access the data in the schema (which may be invoked directly from the client via the procedural service described below).

Real-time Stream Server

Providing isochronous data access is an inherently different problem from traditional types of data access that lack the real-time component.

Therefore, the real-time components of the media server 100 are segmented from the other parts by a scheduling "fire-wall". All access into the real-time section of the server goes through a real-time scheduler 299 which analyzes the load any given request will make on the system, determine if the request can be granted given the current system load, and then schedule the access. The real-time scheduler takes CPU, disk and memory resources into account when analyzing a request.

Even with the scheduler ensuring that the system does not become over-committed, there are many constraints on the real-time server design and operation. The server must:

service a large number of concurrent data streams, each with independent control be reliable through any reasonable hardware or software failure store an enormous amount of data and coordinate movement of that data between different media and different servers allocate bandwidth between parts of the system be portable to any viable server hardware platform Stream Control The real-time stream server provides full VCR-like controls to the user: fast forward and rewind, slow forward and rewind, frame advance and rewind, random positioning, etc. However, it is not simple to fit these features into a real-time scheduling system, since each places a different load upon hardware resources. In addition, depending on the video/audio codec being used, each of these special modes may place different demands upon the real-time scheduler.

In the simplest model, a stream is merely a string of contiguous bits which must appear at the decoder at a particular rate. The server 100 is responsible for accepting a command to start a stream and one to prematurely terminate a stream. In this model, streams would be easy to allocate, schedule and deliver. Maximum service levels could be easily computed.

Unfortunately, the real world is not so simple. During the playback of a stream, many events may require the stream server to change its behavior. For example, if the user presses the pause button on the remote control, the server 100 must stop delivering bits temporarily. Since there are network buffers between the server and the set-top box, the server 100 has no way of determining exactly where the set-top box 110 was paused. So the server 100 and set-top box 110 must communicate so that the server 100 may queue from that point so that it will be ready for the subsequent play command. The present invention provides this position coordination through a real-time stream control interface which resides both on the client and server.

The other VCR control commands are even more complex to implement. They all involve changes of bit rate, hard-to-predict disk seeks, and large amounts of CPU processing. Each of these must be factored in to the real-time scheduler 299 in order to provide the maximum level of continuous guaranteed service.

As described above, there are multiple video compression methods. For each compression-decompression algorithm, a software module handles all the aspects of that algorithm. This module provides entry points not only for all the different rate controls, but also provides entry points to allow the caller to reduce or enlarge the spatial resolution, temporal resolution (frame rate), tunneled date rate, etc. This modular component allows the real-time stream service 224 to stay independent of which codec is used for each stream. The entry points offered for each compression algorithm depend on the capabilities of that codec. For example, single-frame-reverse is not supported in the MPEG-1 or MPEG-Z modules.

By providing random entry ability and controlled playback of data, the stream service not only provides rich real-time stream playback but also is part of the hypermedia interactive environment provided by a client application. Thus, in addition to playing movies at a user's request, the server 100 can play video or audio clips in response to other services, such as home shopping, education and video hyperlinks.

Stream control features make the consumer/client experience superior to that provided by normal video tape in many ways. Users can choose movies in minutes without leaving their houses. They can change their minds half-way through a movie and select another. They can stop a movie half way through and choose to continue it an hour, day, or year later, the digital content never becomes worn or fuzzy form overuse, and the digital frame still and advance capabilities are equivalent to those found only in very high quality VCRs.

Reliability

As information servers take on more and more of the communication tasks of consumers, they will have to become as reliable as the current telephone system. To achieve this, real-time server 100 can be configured for various levels of reliability.

By far the most common failure point in the isochronous server 100 is a magnetic disk drive. This is largely because the disk drives are the only part of the core system with moving parts. Even with mean time between failures (MTBF) of 1,000,000 hours, systems with large farms of disks will experience individual disk failure on a regular basis. For a system with many terabytes on-line, and thousands of disk drives, frequent disk drive failures could render large amounts of content inaccessible.

The real-time server 100 can identify and correct disk failures without interrupting the real-time data flow. The approach used is described in an above referenced co-pending patent application entitled "Real-Time RAID." A new approach is necessary; because, traditional approaches to disk redundancy (e.g. RAID) are anything but real-time. Disks also go off-line many times during the day due to thermal recalibration, predictive failure analysis checks, etc. As with disk failures, the present invention rides through these temporary interruptions without any interruption of real-time service. On any system with disks that may be hot-swapped, when the media server 100 has determined that a disk has failed and needs to be replaced, media server 100 prompts the operator to remove the bad disk canister and load in a new one. Media server 100 then requests resource bandwidth from the server scheduler to rebuild the volume as fast as possible without disturbing stream playback.

The present invention provides two dimensions of reliability configuration for disks. The system manager can select what storage overhead to incur to guard against both multiple simultaneous disk failures or multiple disk chain controller failures. The ability to continue uninterrupted play through both disk and controller failures solves the largest reliability challenge present in the real-time server 100.

The second most common failure is a network backbone communications failure, most likely from a piece of hardware outside the real-time server 100. To cope with this failure potential, the present invention can accept routing commands during stream playback. When the network management service 227 determines that a stream needs to be rerouted, network management service 227 commands the virtual network layer 212 to re-route the signal and simultaneously informs the stream server 224 where it should send the data. This happens on the fly, without having to restart the stream.

Software failure is a third potential source of system failure in the media server 100 of the present invention. For the most part, portions of the media server 100 are logically placed behind a real-time "firewall." These portions are thus independent from each other, so a single softw failure should interrupt at most a handful of streams. Because the realtime stream service 224 checkpoints frequently, a stream can be restarted from a different point in the system quickly with only a small service disruption to the user. Once the service manager detects the software fault, it immediately restarts the parts of the system that failed.

Hardware and software redundancy and independent restart-ability are part of the basic architecture of the media server 100. By placing these elements into every service, a complex system can be diagnosed and restored to normal operation in the shortest possible time.

Storage Capacity

Financially, the key metric in serving video is megabytes per second per dollar (more generally, bandwidth per time per cost). Because different content (feature-length movies, classic movies, home shopping videos) will have different revenue and usage patterns, the server 100 allows the data to be stored on a variety of devices, each with different cost, bandwidth, and capacity characteristics.

The system manages a multi-tiered media datastore 251 where movies might be staged from off-line tape to an on-line optical jukebox to magnetic disk and finally to RAM. With commodity disk drive prices currently at approximately $600/gigabyte, a 2-hour movie costs $800 to store on magnetic storage. This same movie costs $40,000 to store in RAM and about $50 to store on off-line tape. Where the content resides at any given time is determined by the server 100; but, a human server manager can override that decision at any time. When a decision is made to move a portion of media content, this request is scheduled into the realtime scheduler 299 just like user requests.

In addition to staging data between multiple tiers of storage on a single server, the media server 100 can also move between servers over a high-speed inter-server network backplane. Because of the design of the storage system, staging from another server is equivalent to retrieving from off-line tape. When data is moved between different storage media or between servers, the reliable messaging features of the network protocol of the present invention are used.

When media content is loading from a tape, the user is given control as soon as possible without waiting for the entire movie to load. While the movie is playing, media content is cached in either disk or RAM to provide full rewind and still capabilities. Of course, since the movie is loading from a sequential medium, fast forward is limited to the amount the server 100 has loaded ahead of the user's current frame.

Bandwidth Scheduling

Interconnect bandwidth is the limiting factor not only in the networks being deployed but also in the real-time server 100. Even with the high data and video bandwidths being used today, CPU power is plentiful. This bandwidth is divided into three categories: reading from external I/O devices such as disk or tape, internal routing of the data within the server 100, and the external routing of the data over the network. By balancing these three categories, the cost per stream can be minimized.

Building a well balanced system requires that it must be scheduled precisely, or one segment of it may temporarily become overloaded. As described above, the real-time scheduler 299 has a very complex job. It must mix bandwidth requests from streams in normal play-forward mode, others which are being fast-forwarded, disk rebuild processes, downstream application data, off-line media requests, and requests to and from other servers. The real-time scheduler 299 of server 100 allows the system to be used within a small margin of maximum capacity, yet still ensures that no stream will ever glitch.

It is transparent to the system administrator whether the system is serving thousands of streams of the same movie or thousands of streams of different movies: any combination is possible. The manager does not have to make decisions about disk layout in order to achieve better performance for one load pattern or another. In addition, if the network connected to the server 100 supports routing one stream to multiple households, the system can "piggyback" users onto other users already playing that stream at nearby points. Of course, this optimization becomes more complicated when one of the users hits the pause or fast-forward keys, because the server 100 must start a new stream to service the customer who split from the concurrent pack.

Portability

By requiring only a low-level real-time kernel, the media server 100 software is portable among many existing and new hardware platforms. The media server 100 can be delivered on a wide range of conventional systems, ranging from workstations serving a handful of streams through symmetric multiprocessor (SMP) machines up to massively parallel (MMP) machines delivering many thousands of streams. In addition, since the present invention depends only on features that must be minimally present in all hardware, the media server 100 is operating-system independent.

The Network Protocol of the Present Invention

The network protocol of the present invention provides the communication backbone that allows services scattered across heterogeneous, asymmetric networks to communicate with each other transparently. For the most part, the level of exposure of the network for application servers and clients is minimal, since RPC serves to hide these implementation specific details.

Network Layer

Figure 3:
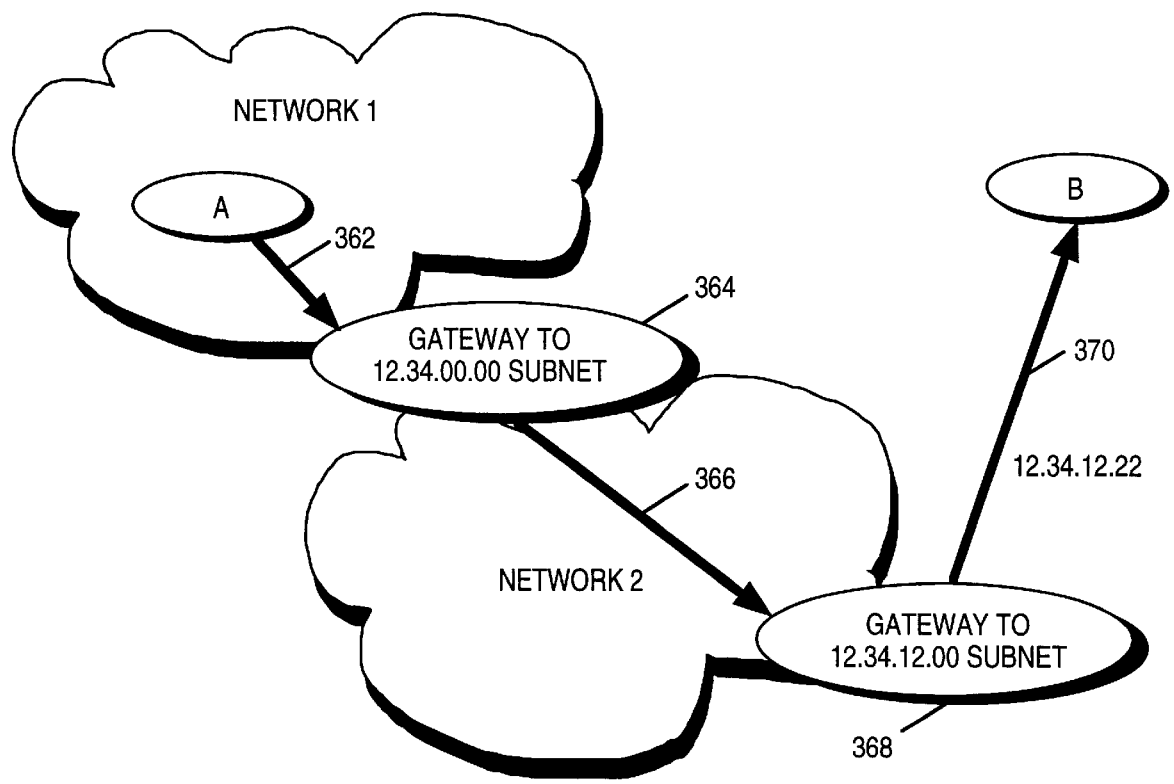
FIG. 3 illustrates the node addressing used in the present invention.
Figure 4:
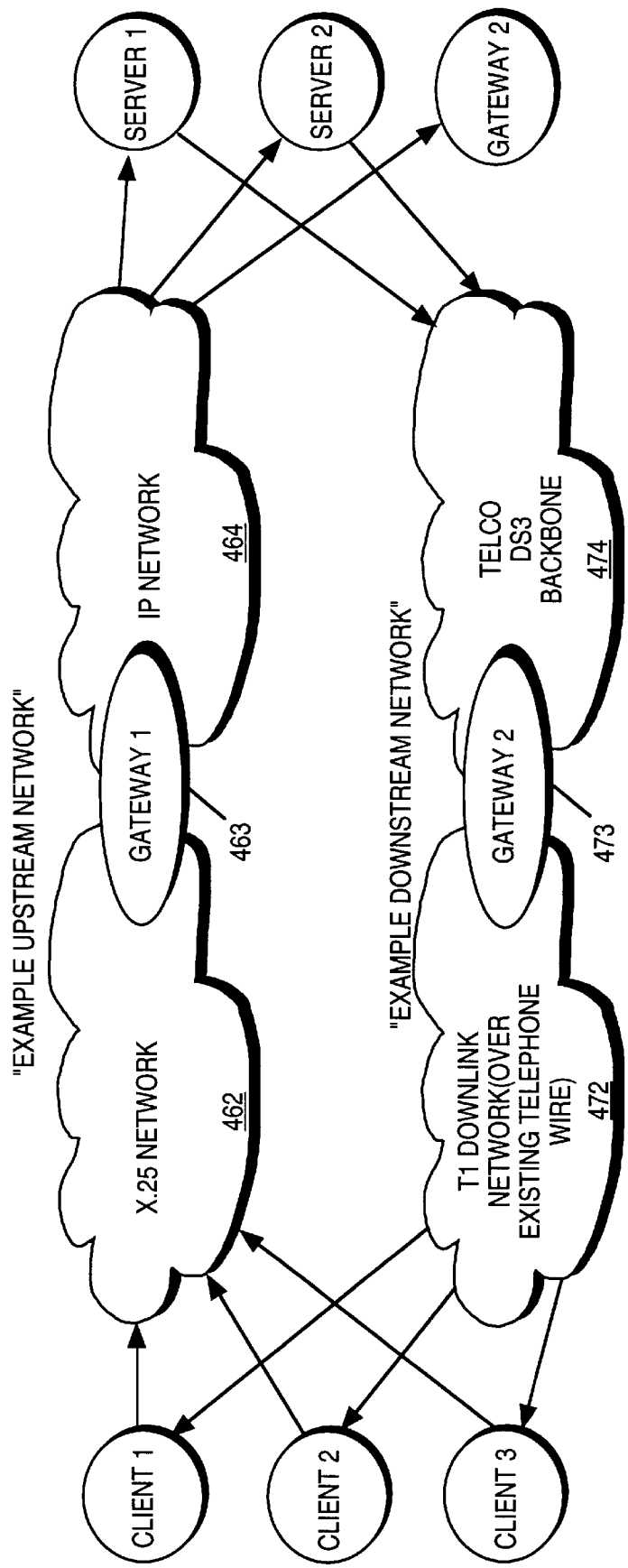
FIG. 4 illustrates the diverse network pathway that may exist between clients and servers.
Figure 5:
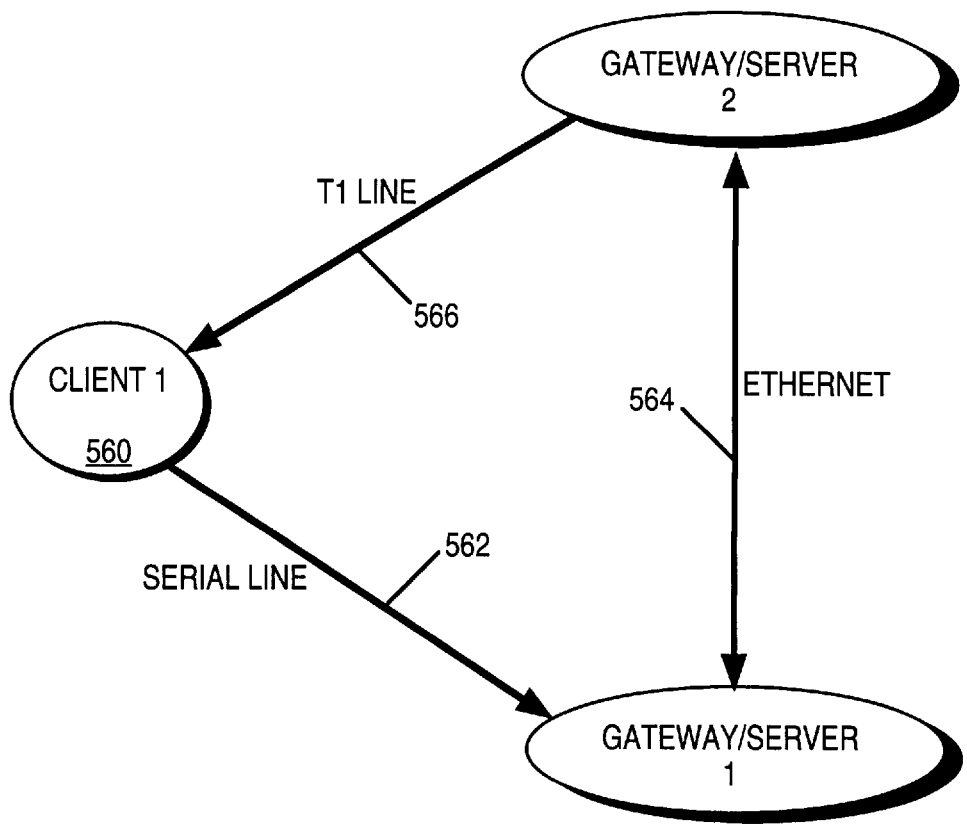
FIG. 5 illustrates the problem with an asymmetric network.

The network protocol of the present invention is composed on one or more underlying networks, each with their own well known characteristics. In the description that follows, the topology of the network is described as a directed graph whose vertices are nodes (either intermediate nodes or endpoints) and whose edges are data links between nodes. FIGS. 3–5 are examples of such a directed graph.

A node is a point in the network through which data is routed. The mapping between a node and an operating system process or machine is arbitrary. A single process may allocate several nodes, and many processes on a machine may allocate nodes independently.

The edges of the graph are directed, which means that each data link specifies the direction in which data can be sent on that link. Some data links are bidirectional. To a user of the network protocol of the present invention, however, the entire network appears bidirectional. That is, given any two vertices, if there is a cycle in the graph that includes the two vertices, those two nodes may communicate. Routing mechanisms in the present invention hide the usual topologies.

Data links may either be packet-switched or circuit-switched. These switching techniques are well known to those of ordinary skill in the art. Using a packet-switched link, data may be directed to any of a number of endpoints by specifying the endpoint address. Using a circuit-switched link, data sent from one end of the data link can only arrive at the other end of the link. Circuit-switched links can be unidirectional or bidirectional. For example, X.25, ATM and TCP/IP are well known bidirectional circuit-switched links. A conventional T1 line carrying data into a client device is a unidirectional link. UDP/IP and most inter-process communication (IPC) facilities are examples of packet-switched links. These link protocols are also well known in the art. In any case, a packet is used as the lowest common denominator or transport means; because, a byte stream may easily be divided into packets.

Routing

Because a packet may travel through several different types of underlying networks, each with their own addressing schemes, the network protocol of the present invention defines its own independent address space. This technique hides the many different types of addresses in use for each type of data link.

Each logical address in the preferred embodiment is a 64-bit word that globally identifies an endpoint of communication, or node. The address maps to a directed edge in the network as described above. When a node sends a message, the node specifies a reply address which maps to the edge directed back toward the sender. This may be the same link over which the data is sent (if the data link is bidirectional); but, it is usually not the same link in the reverse direction.

The routing problem is to find all of the intermediate links between a sender and the end point of the link at the given address. Since this a recursive problem, the address space is divided up into a hierarchy of subnets. Routers need only know how to reach subnets. The knowledge of how to reach a particular node is distributed throughout the system, rather than centrally located in one place.

Referring now to FIG. 3, a prefix of the destination node address is used to identify a subnet. The longer the prefix, the finer the granularity of the subnet. Subnets may be arbitrarily mapped to processes and machines. For example, a single process, may own an entire subnet.

In FIG. 3, node A needs to send a data packet to node B (i.e. the node at address 12.34.12.22. Node A first sends the packet to a gateway 364 for subnet 12.34.00.00, which forwards the packet to gateway 368 for subnet 12.34.12.00. That gateway 368 routes the packet to the destination endpoint B via link 370. Note that an address really identifies a particular link, not a node, so one node may have several addresses. The clouds in FIG. 3 represent different types of underlying conventional networks.

Referring now to FIG. 4, routing decisions are made only when a packet moves across a junction from one type of data link to another. For example, since an Internet Protocol (IP)-based network 464 appears as one hop, the gateway 463 need only be present when a packet must enter or leave the IP-based network and enter or leave a different type of network, such as an X.25 network 462. Since existing network routing need not be replaced, network resources can be used very efficiently. In a completely homogenous bidirectional network, no gateways would be required, and the routing functionality of the network protocol of the present invention would not be used.

Address Requisition

Routing quickly becomes an administrative nightmare if addresses have to be managed manually, especially in situations where large numbers of client devices enter and leave the network with a high rate of turnover. In the present invention, all routing tables are managed dynamically using dynamic address allocation.

When a node is initialized, the node must obtain a logical network address to identify itself. Alternatively, the node may have a well-known address that it needs to announce to other network components. Requesting an address is complicated; because, the data links in the network may be unidirectional, and physical network broadcast (e.g. Ethernet broadcast) is not typically available. Further, it would not be feasible considering the number of nodes in the network.

Referring now to FIG. 5, a basic asymmetric network configuration is illustrated. In order for a node 560 (Client 1 in this example) to obtain a logical network address for itself, the node 560 must know the data link 562 through which it can reach a server, and the link 566 through which it expects the response from the server. The latter downstream link 566 is the link that is actually assigned the address.

The address request from the node 560 specifies the downstream link 566 in a data-link specific manner. The problem is to figure out how to get to that data link assigned. The information provided by the node 560 may not be sufficient to enable completion of the address request. Often the server that receives the address request is not connected directly to the downstream link 566.

In FIG. 5, suppose that gateway/server 1 receives an address request for a client device 560 over a serial line 562. The client specified a T1 line as the downstream link. Unfortunately, the T1 line is not attached to the machine where gateway/server 1 is running; it happens to be attached to a different machine (gateway/server 2), which is connected to gateway/server 1 via Ethernet link 564. Gateway/server 1 forwards the address request over Ethernet link 564 to gateway/server 2, which allocates an address and issues the response to the requesting client device 560 through the downstream channel 566.

The network protocol of the present invention is able to forward address requests in this manner; because, gateways and servers know about each other and about the types of data links to which they are connected. This address requisition process is described in more detail below in connection with a description of the processing performed by the upstream manager 220 and downstream manager 210 of server 100.

Why is all this address request processing necessary? Because the address that is ultimately assigned to a data link must belong to a subnet that identifies the appropriate destination.

Suppose the client 560 requested a second address, but this time specified the serial line 562 (now bidirectional) as the downstream link. This time, gateway/server 1 can assign an address itself; because, it is connected directly to the serial line 562. However, the client 560 now has a second address completely unrelated to the first address. This leads to an important point: only a server attached to the head of a link can legitimately assign an address for that link.

As a very useful side effect, the dynamic address allocation of the present invention causes the creation and maintenance of routing tables. Because the address request is self-identifying (even if only in data-link-specific terms), the server has enough information to enter new routes into the appropriate routing tables. Servers themselves may requisition entire subnets from larger-scale servers, thus serving to automate large amounts of network administration.

Reliable Messaging

Network links are assumed to have the usual array of problems: they can drop packets, deliver packets out of order, duplicate packets or corrupt packets. The conventional transport layer on which the present invention is built provides reliable communication over such networks. Like the network layer, the transport layer does not replace or duplicate existing functionality. The network protocol of the present invention can provide reliability cheaply, without using its own mechanism on top of an already reliable link. Of course, if the data travels over multiple links, and at least one of those links is unreliable, then the transport layer will revert to using its own reliability mechanisms for that data.

Reliability is implemented using a straightforward positive acknowledgment with retransmission on time-out strategy. However, the characteristics and usage of the network make it difficult to estimate timeout. Consider a T1 line with 1.5 megabits/sec capacity. All of the bandwidth may be available for data traffic until a user starts receiving video. Then, the bandwidth left for data is suddenly reduced to less than 20 kilobits/sec with typical MPEG compression. At the other extreme, consider a personal digital assistant (PDA) user who moves from wireless to wire-based communication by plugging in a phone jack. In this case, the bandwidth available jumps dramatically.

The transport layer must be able to adapt to these changes in order to maintain reliable and efficient transport. The conventional TCP/IP means of solving these problems are ineffective because they rely on the existence of a connection. Since most data traffic in these networks is connectionless (for reasons explained below), another solution must be used.

The principle behind the solution is the same as for TCP/IP: If the round-trip-time-the time elapsed from when the message was sent to when an acknowledgment was received-diverges widely from the expected round-trip time, we can assume that the available bandwidth of at least one link has changed.

However, without connections, tracking round-trip times provides almost useless information. There is no reason to assume that the same round-trip will occur repeatedly. Nor does it help any of the other nodes in the network. Instead, the network protocol of the present invention focuses on trip times across individual links. This information is propagated through the network over time to allow individual nodes to have local access to trip estimate information. To avoid saturating the network with control messages, this information is usually piggy-backed inside data messages. As a benevolent side effect of the propagation, brief, spurious fluctuations in bandwidth have no noticeable impact on trip estimation.

The present invention provides an architecture in which this consumer model can evolve. By offering a service framework that supports server application development, the media server 100 allows developers to concentrate on the design of the media-based applications, such as interactive shopping, news, games, research and education. The network protocol of the present invention enables these applications to communicate transparently across the complex asymmetrical networks of today. Behind the services architecture, an isochronous server and traditional data access methods deliver an information-rich environment to the consumer via RPC.

Media Server Architecture

Referring again to FIG. 2, the architecture of the media server 100 is described in detail in the following sections. The media server 100 includes these components as shown in the FIG. 2:

upstream manager 220
downstream managers 210
connection service 230
boot service 216
blob service 218
name service 222
stream services 224
authentication service 226
application services 240
media data store (MDS) 251
real-time scheduler 299
network management service 226
administration and monitoring service 298

Upstream Manager 220

The upstream manager 220 (USM) accepts messages from set-top boxes 110 and routes them to services on the media server 100. The upstream manager 220 also binds a downstream link for the messages in a manner described in more detail below.

Downstream Manager 210

The downstream manager 210 (DSM) sends a stream of data, both video and non-video, to a set-top box 110. When a set-top box 110 requests data, the data is read from the MDS 251 and the downstream manager 210 sends the data to the set-top box 110. The downstream manager 210 handles a real time data stream concurrently with a non-real time data stream as is described below.

The USM 220 and the DSM 210 are gateways that bridge two different types of networks. The USM 220 and DSM 210 move data packets (i.e., portions of messages) across the bridge from one type of network to another. These packets are routed independently from each other. The routing is based on the intended destination of the packets. These packets are portions of messages that may have originated from a client (set top box 110) or a server 100, such as in response to a remote procedure call RPC. In any case, in the preferred embodiment, neither the USM 220 nor the DSM 210 actually decodes the messages and processes them. The USM 220 and DSM do not attempt to assemble or disassemble these messages. The USM 220 and DSM 210 see each packet as an independent entity which is to be routed based on a destination address stored in the packet header.

Connection Service 230

The connection service 230 maintains a connection database that keeps track of all currently active circuits on media server 100 and their physical and logical addresses. When a set-top box 110 initially connects to the media server 100, the set top box 110 sends a message to the connection service 230 via the upstream manager 220. The connection service 230 then establishes a downstream manager 210 for the circuit and updates the connection service database.

The present invention is intended to be able to adapt itself to a variety of network topologies. Asymmetric networks complicate the process by which client programs connect to the media server 100. The Connection Service 230 is designed to encapsulate those complications.

The Connection Service 230 provides a generic control point for establishing connections between the media server 100 and its clients. It manages allocation and deallocation of asymmetric virtual circuits through the media server 100. The Connection Service 230 can be queried for information about its mappings and can inform interested parties of changes in connection state.

The Connection Service 230 is the single, reliable repository for address mappings. Other services may cache needed addresses for performance reasons; if they crash, though, those mappings can always be reconstructed by querying the Connection Service 230.

In an asymmetric network, upstream and downstream messages between a client and a server take place over distinct network interfaces. For example, messages from a client to a server may be routed over an X.25 packet-switched network, while responses from the server back to the client flow over a dedicated T1 line. This was described above in connection with FIG. 5.

Before a client can hold round-trip conversations using the media server 100, a virtual circuit between the upstream and downstream networks must be established. The Connection Service 230 is responsible for creating and managing these virtual circuits. Connection Service 230 makes the following assumptions about the nature of the network:

Upstream communications will normally be low bandwidth, while downstream communications will be high bandwidth.

When a client wants to connect to the media server 100, a physical upstream channel—by which the client can address the server—will already exist.

Upstream channels can be multiplexed through one or a few Upstream Managers.

One instance of the downstream manager is dedicated to a single downstream channel (and therefore to a single set-top box).

It is up to deployment-specific conventional software in the virtual network layer 212 to manage physical upstream channels. It may be the case that some server process, under the direction of an external network control node, actually establishes contact with the client. Conceptually, however, this protocol is transparent to the media server 100 proper.

A virtual circuit in the preferred embodiment consists of five items of information:

A physical address controlled by the downstream manager (DSM) 210. That is, the actual addressing information used to put bits down a wire.

A control port by which the instance of DSM 210 can be addressed. This is the logical address used by the boot service 216 and stream service 224 to send data to the client.

The logical address of a client. Because it is known that a single DSM 210 can only serve one client (and one virtual circuit) at a time, this logical address is pre-assigned when the DSM 210 is booted. The same logical address is recycled as clients connect to and disconnect from the media server 100.

A client's upstream physical address. This is an opaque, port-specific upstream physical address from which a client sends data.

A client's downstream physical address. This is an opaque, port-specific downstream address at which a client receives data.

The client's downstream physical address represents the far end of the connection for which a DSM physical address is the head end.

The binding among the resources managed by a given downstream manager (the downstream physical address, the logical address of the DSM 210, and the logical address of the client) are collectively referred to as the DSM binding.

The client's upstream and downstream physical addresses together are called the client physical address. The client physical address is sufficient to uniquely identify a virtual circuit.

Connection establishment is highly deployment-specific, but consists of four distinct phases.

1. The client communicates with the upstream manager 220 of the media server 100.

2. The client communicates with the Connection Service 230 to establish a virtual circuit through a media server 100. This phase results in a round-trip path through the physical network to the client.

3. The client conducts a conversation with the Boot Service 216 to download any necessary software.

4. The client requests a logical client address for itself from the media server 100.

Depending on the simplicity of the deployed network and the sophistication of the client, the first three steps may be abbreviated, or even absent. Before participating fully in the operation of the present invention, the client must request a logical client address for itself.

The Connection Service 230 can be queried by any other service that needs to map between resources or that wants to inquire about the state of a connection. For example, if the stream service 224 receives a network message from a client to play a stream, the stream service 224 needs to locate the Downstream Manager 210 associated with that client in order to give it indexing commands. The stream service 224 obtains a mapping between the client and its downstream manager from the Connection Service 230.

Boot Service 216

When a user turns on the set-top box 110, set-top box (STB) 110 sends a boot request message to the upstream manager, which determines what image to use to boot this STB 110. The STB 110 then tells the boot service 216 which boot image to send. The boot service 216 communicates with the downstream manager 210 to accomplish transfer of the boot image to the STB 110. The boot image is an executable image that boots the set-top box 110. The set-top box 110 then boots. The boot image is stored in the media data store (MDS) 251.

Once the client has established a virtual circuit through the media server 100, the client can send data to and receive data from services in the media server 100. However, the client still lacks its system software (unless it is stored in ROM) and the client network software. The client acquires any system software it needs using the Set-top Boot Protocol, which is implemented by the boot service.

For the purposes of the Boot Protocol, the downstream manager 210 serves as a proxy for the client.

1. The set-top box sends a boot request to the media server 100.

2. The upstream manager 220 and the connection service 230 cooperate to communicate addressing information to the boot service 216.

3. The boot service 216 sends the boot image to the downstream manager 210.

4. The downstream manager 210 extracts the boot image from data messages and sends the boot image to the set-top box 110 as raw data on the downstream physical network.

5. The set-top box 110 boots and begins to run network software.

BLOB Service 218

This service 218 controls the transmission of binary large objects (arbitrary sequences of bytes) downstream to the client without processing overhead. In general, the BLOB data is retrieved from MDS 251 and efficiently sent down channel 124 to a client device 110. This technique is the subject of two other above-referenced co-pending patent applications.

Name Service 222

The name server 222 provides a global repository of string information that is accessible from any node. The name server 222 consists of the name server process and a programmatic interface which links into the processes that communicate with the name server. Processes obtain information about other services from the name server 222.

Stream Service 224

The stream service 224 processes rate control messages from the set-top box 110. When a set-top box 110 viewing a video file sends a rate control instruction, the stream service 224 receives the message via the upstream manager 220, reads a tagged file necessary for rate control from the MDS 251, and sends a message to the downstream manager 210. Generally this message tells the downstream manager 210 which portions of the video file to send to the set-top box 110 to perform the rate control instruction. When the set-top box 110 plays video without rate control, the stream service 224 simply passes a play message to the downstream manager 210.

To accommodate many set-top boxes, many instances of the stream service 224 can run on the server 100. The stream service 224 can run in either single-instance mode or concurrent mode. In single-instance mode, there is only one instance of the service. In concurrent mode, many instances of the stream service run concurrently to accommodate many set-top boxes. Messages to the stream service 224 are received by an instance controller 229 and then routed to an available stream service instance. After the stream service instance has handled the message, the instance notifies the instance controller 229 that the instance is available to handle another message. Each stream service 224 instance can accommodate roughly 100 set-top boxes. By providing multiple instances of the stream service 224, the load on the media server 100 can be more effectively balanced.

Authentication Service 226

The authentication service 226 maintains an authentication database that keeps track of authorized media server 100 users, households, and set-top boxes 110. The authentication service 226 accesses this authentication database to verify authorization for both hardware and users. For example, when a set-top box 110 initially requests a connection to the media server 100, the authentication service 226 verifies that the box 110 box 110 and household where it is located are registered for connection to the media server 100.

The application running on the set-top box 110 can also require that the user enter a personal identification number (PIN) when logging in to the application or before requesting a movie. The authentication service 226 then verifies the user/PIN combination before the application allows the user to continue.

Application Services 240

Application services 240 receive messages from the upstream manager 220 and send messages to system services (such as the stream service 224) and other application services on behalf of applications running on set-top boxes 110. The application services 240 encompass many different types of application services including math services 242, home shopping services 244, movies on demand services 246, news on demand services 248 or other application specific services 249. These services are implemented with standard interfaces so the services are generally accessed in the same manner by a client or other server 100 services.

Media Data Store (MDS) 251

The media data store (MDS) 251 is a real-time file system that is optimized for storage and real-time retrieval of large files, such as MPEG movies, blobs, boot images, and cards.

The MDS 251 stores files in volumes. A volume is a named collection of disks. Each volume stores files in a flat namespace. The MDS 251 provides quick access to a file given a unique ID, such as the filename. The MDS 251 is not meant to be a general purpose file system with directories that can be searched and browsed. Sophisticated databases and client user interface applications control that level of interaction.

The MDS 251 supports striping and RAID (redundant array of inexpensive disks) protection. Striping means a well known technique of dividing each file into pieces, or stripes, and storing each stripe on a different disk. Striping improves performance if some files are often accessed by many users concurrently. Storing small pieces of a heavily-accessed file on different disks distributes access to the file across those disks, rather than concentrating it on one.

Real-Time Scheduler 299

The real-time scheduler 299 controls access into the real-time section of the server 100. Real-time scheduler 299 receives access requests for real-time service and determines the loading impact the access will have on the system. The real-time scheduler 299 determines if the request can be granted given the current server load. If the request can be granted, the access is scheduled. The real-time scheduler 299 takes CPU, disk, and memory resources into account when analyzing a request.

Network Management Service 226

The network management service 226 accepts routing commands during real-time stream playback. The network management service 226 determines if a stream needs to be re-routed given loading conditions and routing requests. If a stream needs to be re-routed, the network management service 226 commands the virtual network layer 212 to re-route the stream. Stream Server 224 is also notified of the new routing.

Administrative and Monitoring Service 298

The media server 100 includes a performance monitoring function and capability for test and debug.

Operation of the Preferred Embodiment

The media server 100 of the present invention uses the above described components to establish and control virtual connections between the media server 100 and an STB 110 as illustrated in FIGS. 6–12 and described below.

Figure 6:
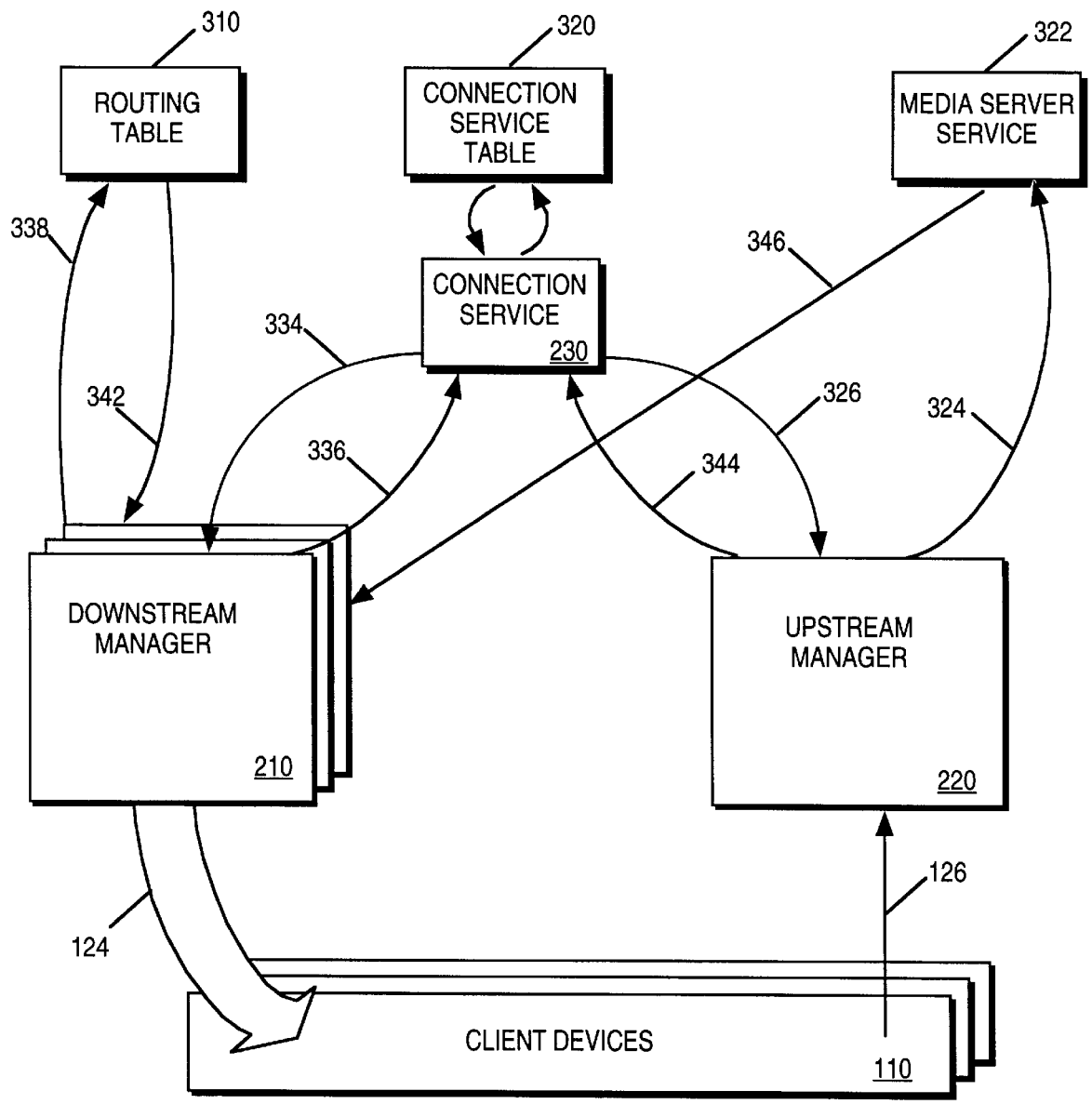
FIG. 6 illustrates the upstream manager interfaces in the media server.

Referring now to FIG. 6, a block diagram illustrates the processing performed by the upstream manager 220 for establishing a virtual circuit. A client device 110 sends a request for service to upstream manager 220 on line 126. As described earlier, line 126 represents a data transfer through an arbitrary network. In a manner described below in connection with FIGS. 9 through 12, upstream manager 220 accesses connection service 230 to obtain a binding between the incoming request for service from line 126 and a downstream manager 210 for routing a response message or data stream on line 124 back to the client originating the request for service. Connection service 230 accesses a connection service table 320 to obtain information regarding the relationship between the upstream physical address, the client logical address, a corresponding downstream physical address, and a corresponding downstream logical address. When a virtual connection is initially established, connection service 230 allocates space for the new connection through downstream manager 210. The connection information is stored in a routing table 310 and the connection service table 320. Once upstream manager 220 obtains a downstream manager 210 binding from connection service 230, the upstream manager 220 modifies the service request message received from client 110 to insert downstream manager binding information into the message. The service request message is then routed by upstream manager 220 to the requested media service 322 on line 324. Response messages or data stream activations are sent by the media service 322 directly to the downstream manager 210 identified by the binding information inserted into the service request message by upstream manager 220. In this manner, media service 322 is able to route information back to the client 110 through the previously bound downstream manager 210.

Referring now to FIG. 7, the structure of connection service table 320 is illustrated. Connection service table 320 comprises upstream manager physical address 410, client logical address 412, downstream manager physical address 414, downstream manager logical address 416, and downstream client physical address 418. Because the present invention is best used in an asymmetric network, the channel used by the client for transmitting service requests and information is not the same channel used by the client for receiving information from the server. The connection service table 320 is used to maintain information pertaining to the binding between the upstream channel and the downstream channel. Upstream manager physical address 410 is a port specific upstream physical address from which the upstream manager 220 receives data from a client 110. Client logical address 412 comprises an identifier of a client running on client device 110 which originates service requests for server 100 and consumes response messages and data streams received from media server 100. Downstream manager physical address 414 is a port-specific downstream physical address from which downstream manager 210 sends data on line 124 to a client device 110. Downstream manager logical address 416 uniquely identifies an instance of downstream manager lo 210 which is used for managing the channel identified by downstream manager physical address 414. Downstream client physical address 418 identifies the port-specific downstream address at which a client receives data from server 100. When a connection is initially established between a client 110 and server 100, the information in connection service table 320 is initialized to represent the binding of a complete set of links between a clients upstream and downstream channels. It will be apparent to those of ordinary skill in the art that additional connection information may be maintained in connection service table 320.

Referring now to FIG. 8, the routing table 310 is illustrated. Routing table 310 maintains information which associates a particular downstream physical address 422 with a corresponding downstream logical address 420. Because instances of downstream manager 210 may control a plurality of downstream manager physical addresses, routing table 310 is needed to maintain the association between instances of downstream manger 210 and the downstream physical addresses they control. Thus, routing table 310 comprises a downstream logical address 420 and corresponding downstream physical addresses 422 which are associated with the particular downstream logical address 420. Routing table 310 is built when the server 100 is initialized at system start-up.

Referring now to FIGS. 9 through 12, flow charts illustrate the processing logic performed by upstream manager 220 and connection service 230 of server 100 when a connection with a client 110 is first established and subsequently accessed in a request for service by client 110 through server 100.

Figure 9:
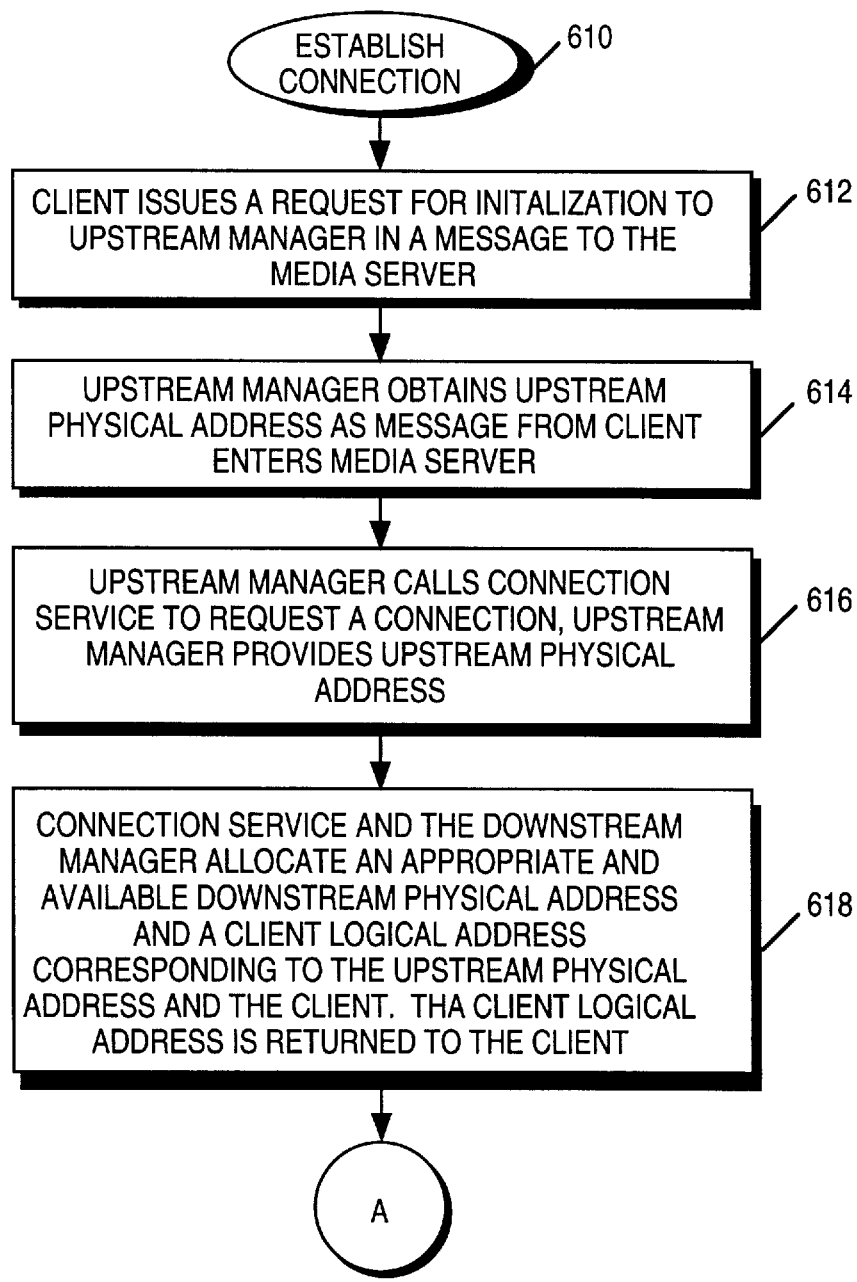
FIGS. 9–10 are flowcharts illustrating the processing flow for establising a connection between a client and the media server.

Referring now to FIG. 9, the processing logic for establishing a connection from client 110 to server 100 is illustrated. In an initial message sent by client 110 to upstream manager 220, the client issues a request for initialization to media server 100 (processing block 612). In processing block 614, upstream manager 220 obtains the upstream physical address from a lower network layer of server 100 as the message from the client enters the media server 100. The upstream physical address identifies the client running on client device 110 that has originated the request to establish a connection with server 100. The upstream manager 220 is now aware of the client upstream physical address. The upstream manager 220 calls connection service 230 to request a connection for the client originating the connection request. Upstream manager 220 provides the upstream physical address to connection service 230 on line 326 (processing block 616). Connection service 230 accesses downstream manager 210 to request an instance of downstream manager 210 and a downstream physical address for the requesting client (processing block 618). The downstream manager 210 causes the allocation of a client logical address corresponding to the client. This client logical address is then returned to the client. Processing then continues at the bubble labeled A illustrated in FIG. 10.

Figure 10:
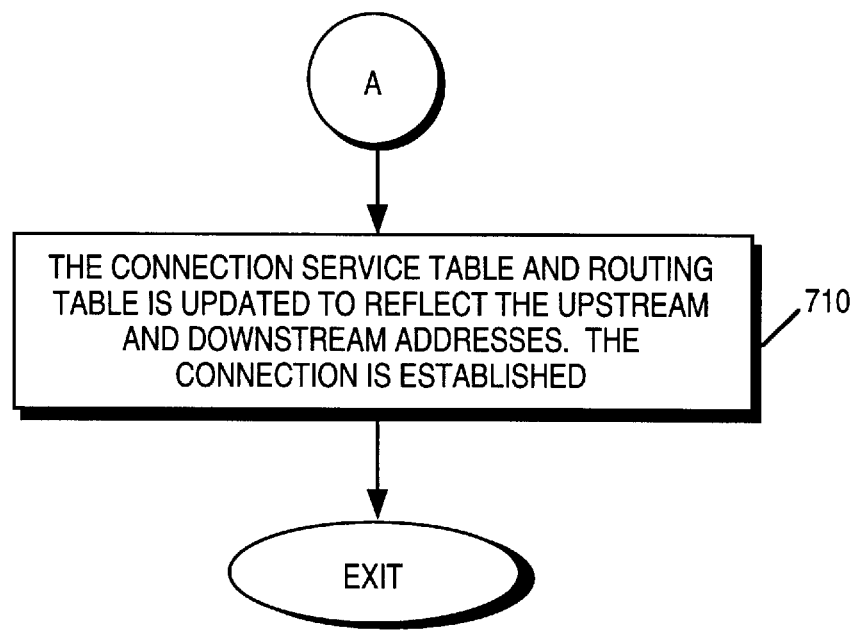

Referring now to FIG. 10, processing for establishing a connection between a client and server 100 continues at the bubble labeled A. Once the connection service 230 has obtained a downstream manager logical address and a downstream manager physical address from downstream manager 210, the connection service table 320 and the routing table 310 is updated to record the association between the client logical address, the upstream physical address, the downstream manager logical address, and the downstream manager physical address. Having established the connection (processing block 710), processing for establishing a connection terminates through the exit bubble illustrated in FIG. 10.

Figure 11:
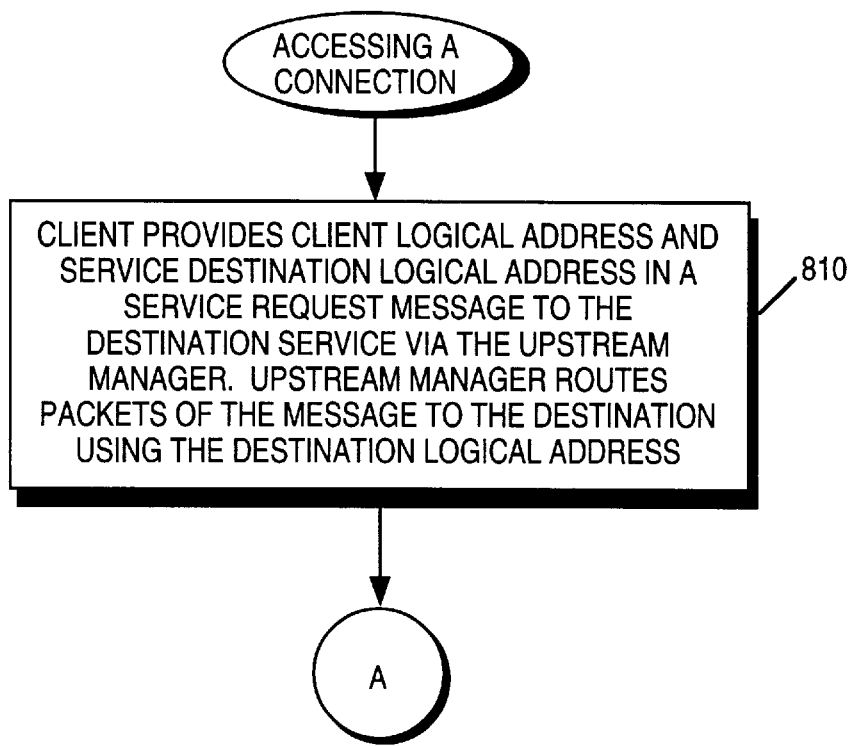
FIGS. 11–12 are flowcharts illustrating the processing flow for accessing a service thorough the media server.

Referring now to FIG. 11, processing logic by which a client on client device 110 accesses a service on server 100 is illustrated. The client sends a message via upstream manager 220 to request a service on server 100. The client provides the client logical address in the service request message initially received by upstream manager 220. The client also provides the logical address of the server that is the destination of the message. The message is broken down into packets and sent to the upstream manager 220 on the upstream channel 126. The upstream manager 220 simply routes these packets to the requested service using the logical destination address provided by the client. The message still carries the client logic address of the client that originated the message (processing block 810). Processing for accessing a service then continues through the bubble labeled B illustrated in FIG. 12.

Figure 12:
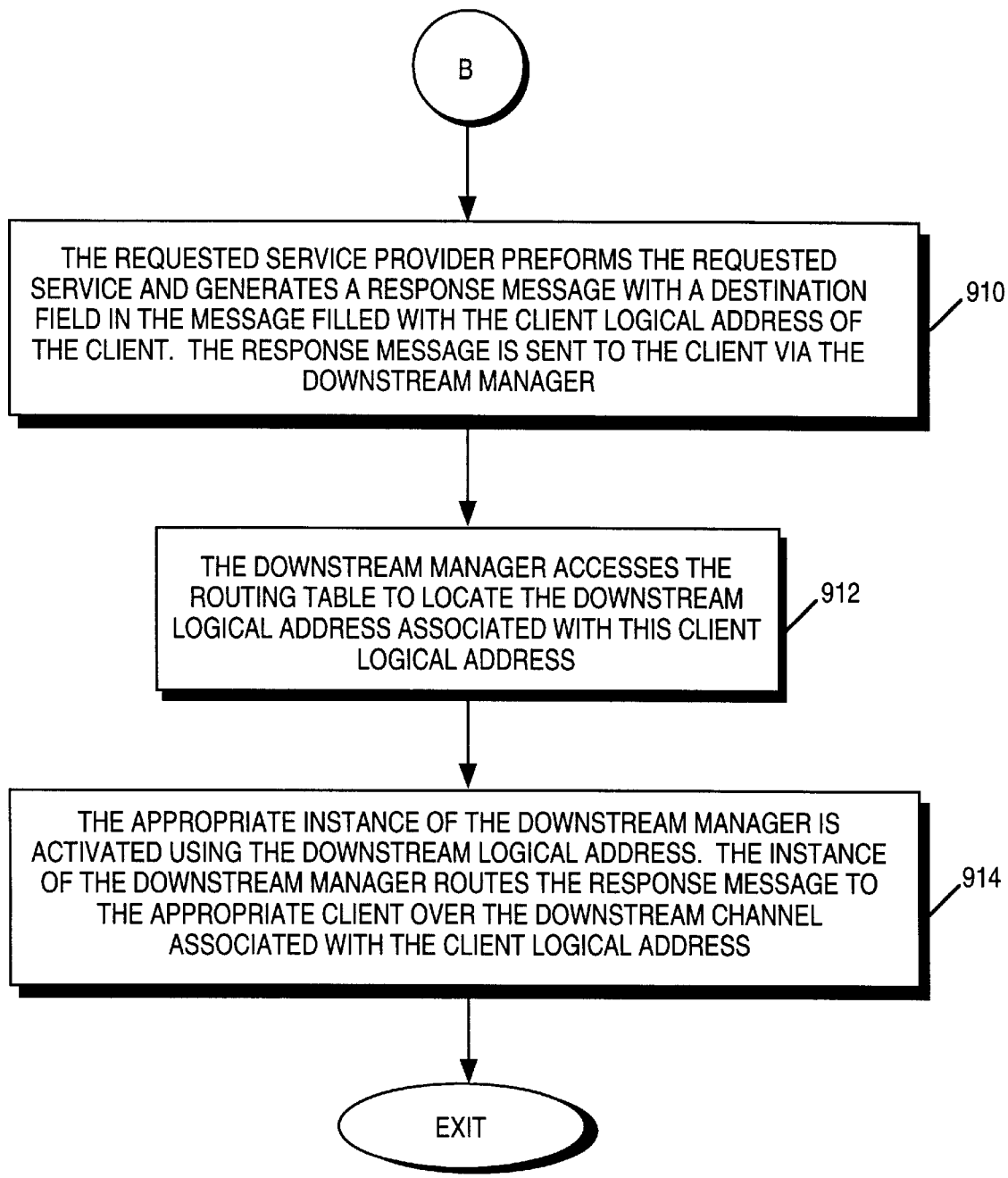

Referring now to FIG. 12, processing logic for accessing a service continues through the bubble labeled B. The requested service provider 322 performs the requested service and generates a response message with a destination field in the message filled with the client logical address of the corresponding client (processing block 910). The response message from the service 322 is sent to the client via the downstream manager 210. Downstream manager 210 accesses the routing table 310 to locate the downstream logical address associated with the client logical address (processing block 912). The appropriate instance of the downstream manager 210 is activated using the downstream logical address and the correct non-real-time queue within the downstream manager 210 is used to hold the message. This instance of the downstream manager 210 routes the response message from service 322 and the particular non-real-time queue to the appropriate client over the physical downstream channel of line 124 associated with the client logical address (processing block 914). The downstream manager 210 knows which physical channel to use based on the queue from which the downstream manager 210 retrieves the data. The response message from service 322 or the data stream initiated by service 322 thereby finds its way back to the originating client on client device 110. This design allows one instance of the downstream manager 210 to support multiple channels. Processing for accessing a service terminates through the exit bubble illustrated in FIG. 12.

It is important to note that all routing is accomplished based on logical addresses, not physical addresses. In other words, packets (and therefore messages) only contain logical addresses of the sender and receiver. At various points in the network, routing decisions need to be made. It is at these points that a physical address is determined from a local routing table based on the logical destination address. The packets are then sent along the physical channel indicated by the determined physical address. The content of the packets are not modified by this routing processing. Further routing decisions are made in the same manner until the packet ultimately reaches its destination. At the destination, the packets are re-assembled into the original message and provided to the message receiver.

Figure 13:
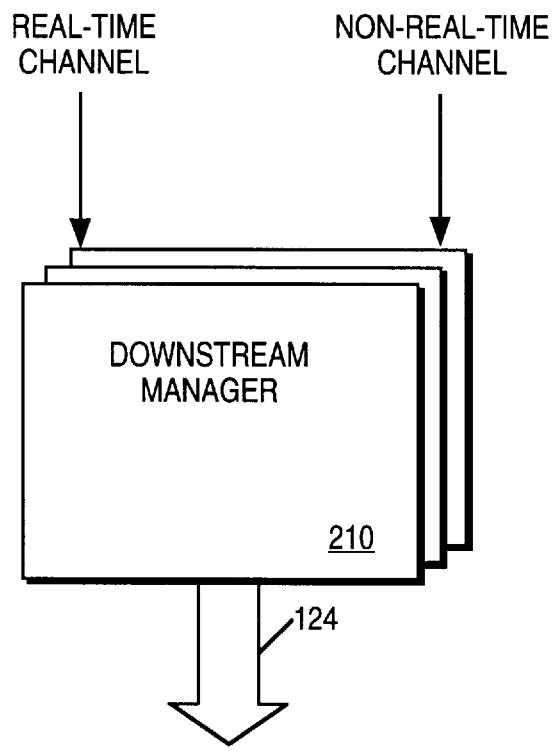
FIGS. 13–14 illustrate the dual channel input to the downstream manager.
Figure 14:
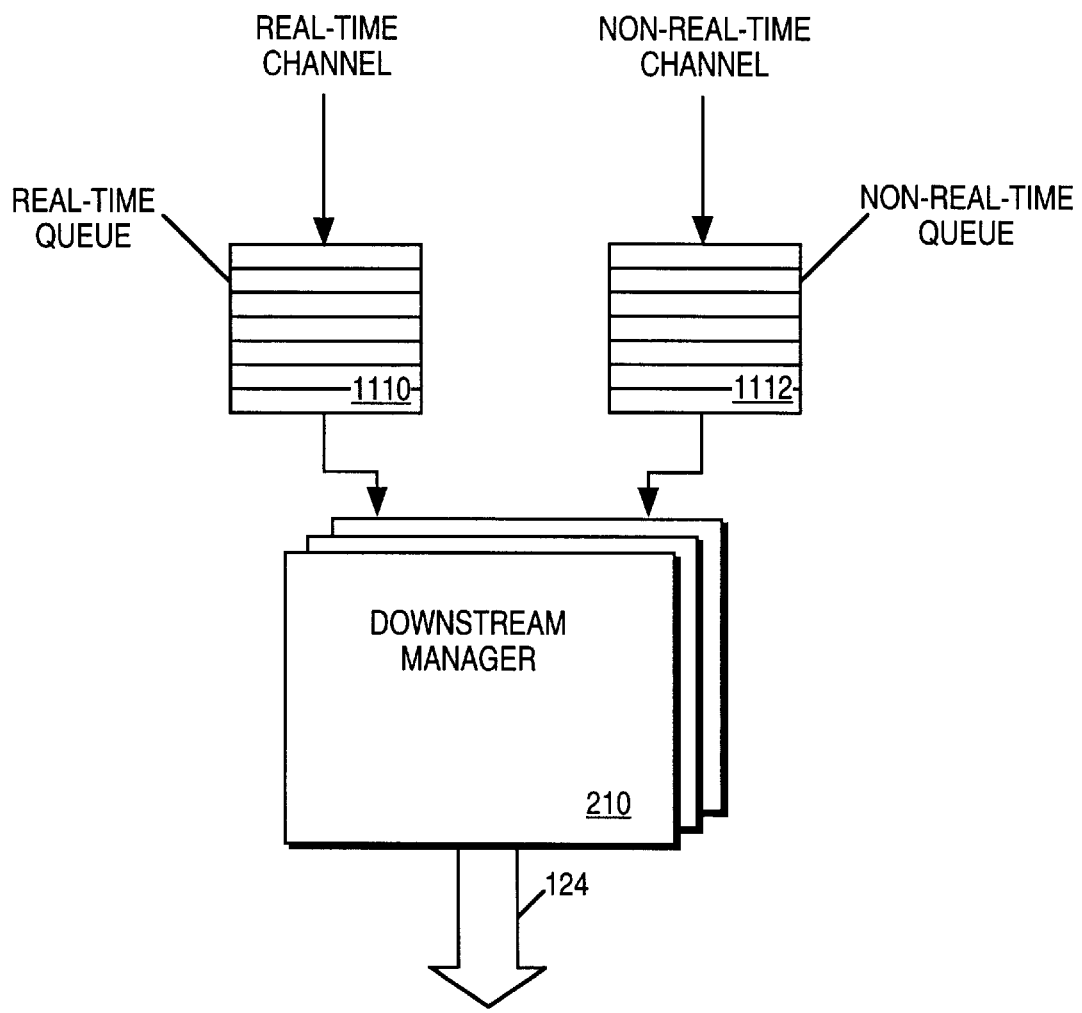

Referring now to FIGS. 13 and 14, a block diagram of downstream manager 210 is illustrated. Downstream manager 210 receives input over two basic types of input channels. First, a real-time stream of data is received over a real-time channel. Secondly, sporadic and asynchronous non-real-time data is received over a non-real-time channel. Downstream manager 210 includes logic for multiplexing information received over these two channels and producing a combined or composite set of information output to a client on channel 124 through network 120. Although channel 124 is a high bandwidth transmission line, downstream manager 210 must nevertheless efficiently manage this output channel to insure that a stream of real-time data received from the real-time channel is not disturbed by the transmission of non-real-time date received from the non-real-time channel. On the other hand, the downstream manager 210 must prevent critical non-real-time data from being shut out because of a continual stream of real-time data Thus, downstream manager 210 includes logic for optimally managing the bandwidth available on line 124. When this bandwidth or a portion thereof is needed for the transfer of a real-time data stream received from the real-time channel, downstream manager 210 provides the necessary bandwidth for the real-time data stream. If any remaining bandwidth on line 124 is available, downstream manager 210 provides this remaining bandwidth for the transfer of non-real-time data received over the non-real-time channel concurrently with the transfer of the real-time data stream on line 124. If no requests for the transfer of real-time data are pending, downstream manager 210 allows the transfer of non-real-time data over a larger portion of the bandwidth of line 124 than could be accommodated if bandwidth was required for the transfer of real-time data. In this manner, downstream manager 210 dynamically allocates the available bandwidth of line 124 between a real-time data source and a non-real-time data source.

Referring now to FIG. 14, the implementation of the preferred embodiment of the present invention is illustrated. Downstream manager 210 provides two sets of queues for managing the two types of input data. First, a real-time queue or set of queues 1110 is interposed between the real-time input channel and downstream manager 210. The real-time queue 1110 receives requests for real-time data transfers and queues these requests using traditional queuing techniques. In addition, a non-real time queue or set of queues 1112 is interposed between the non-real-time input channel and downstream manager 210. The non-real-time queue 1112 receives requests for the transfer of non-real-time data and queues these requests using standard queuing techniques. Downstream manager 210 pulls requests from either of these two queues as the available bandwidth on line 124 allows. The processing involved for accomplishing this task is illustrated in FIG. 15.

Figure 15:
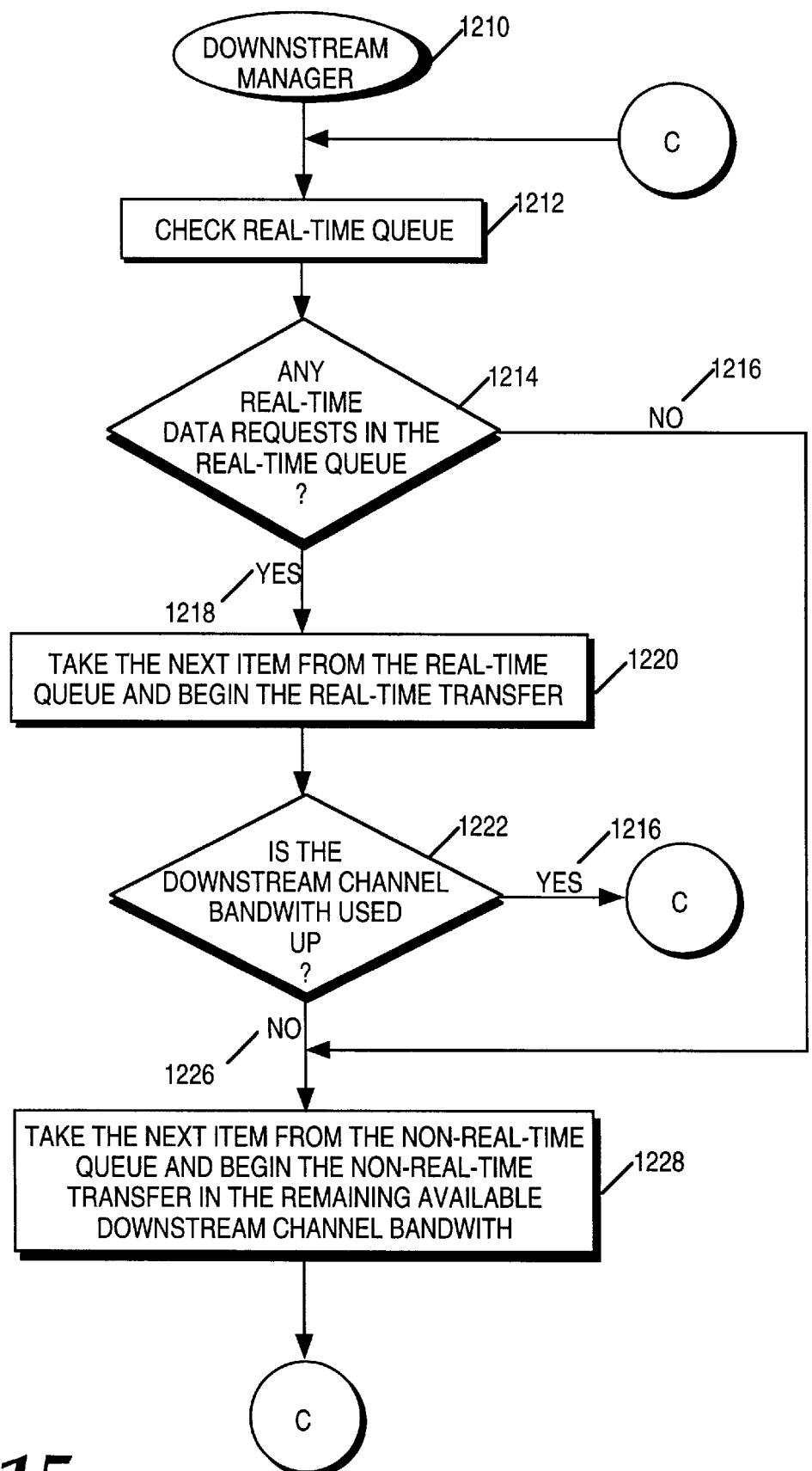
FIG. 15 is a flowchart illustrating the processing flow used in the downstream manager for controlling the real-time and non-real-time input streams.

Referring now to FIG. 15, a flow chart illustrates the processing logic performed by downstream manager 210 for controlling the real-time and non-real-time data transferred over line 124 to client device 110. Downstream manager 210 receives real-time data transfer requests through real-time queue 1110 and non-real-time data transfer requests through non-real-time queue 1112. Because the requests in real-time queue 1110 receive priority in the preferred embodiment, the content of real-time queue 1110 is checked in processing block 1212 as illustrated in FIG. 15. If any real-time data transfer requests are present in real-time queue 1110, processing path 1218 is taken to processing block 1220. In this case, the next data transfer request is retrieved from the real-time queue 1110 and the real-time data transfer is initiated over line 124 (processing block 1220). If this real-time data transfer consumes the entire available bandwidth of line 124, processing path 1224 is taken to the bubble labeled C illustrated in FIG. 15 where the real-time queue is checked for any additional real-time data transfer requests. If the entire bandwidth of the downstream channel 124 is not allocated (processing path 1226), or if no real-time data transfer requests are pending in real-time queue 1110 (processing path 1216), processing block 1228 is performed. In this case, the next request from the non-real time queue 1112 is retrieved and the non-real-time data transfer is initiated in the remaining available bandwidth of downstream channel 124. Processing then continues through the bubble labeled C illustrated in FIG. 15 where the real-time queue is again checked for additional pending data transfer requests. In this manner, the downstream manager 210 multiplexes real-time and non-real-time data transfer requests for concurrent transfer over a downstream channel of limited bandwidth.

Figure 16:
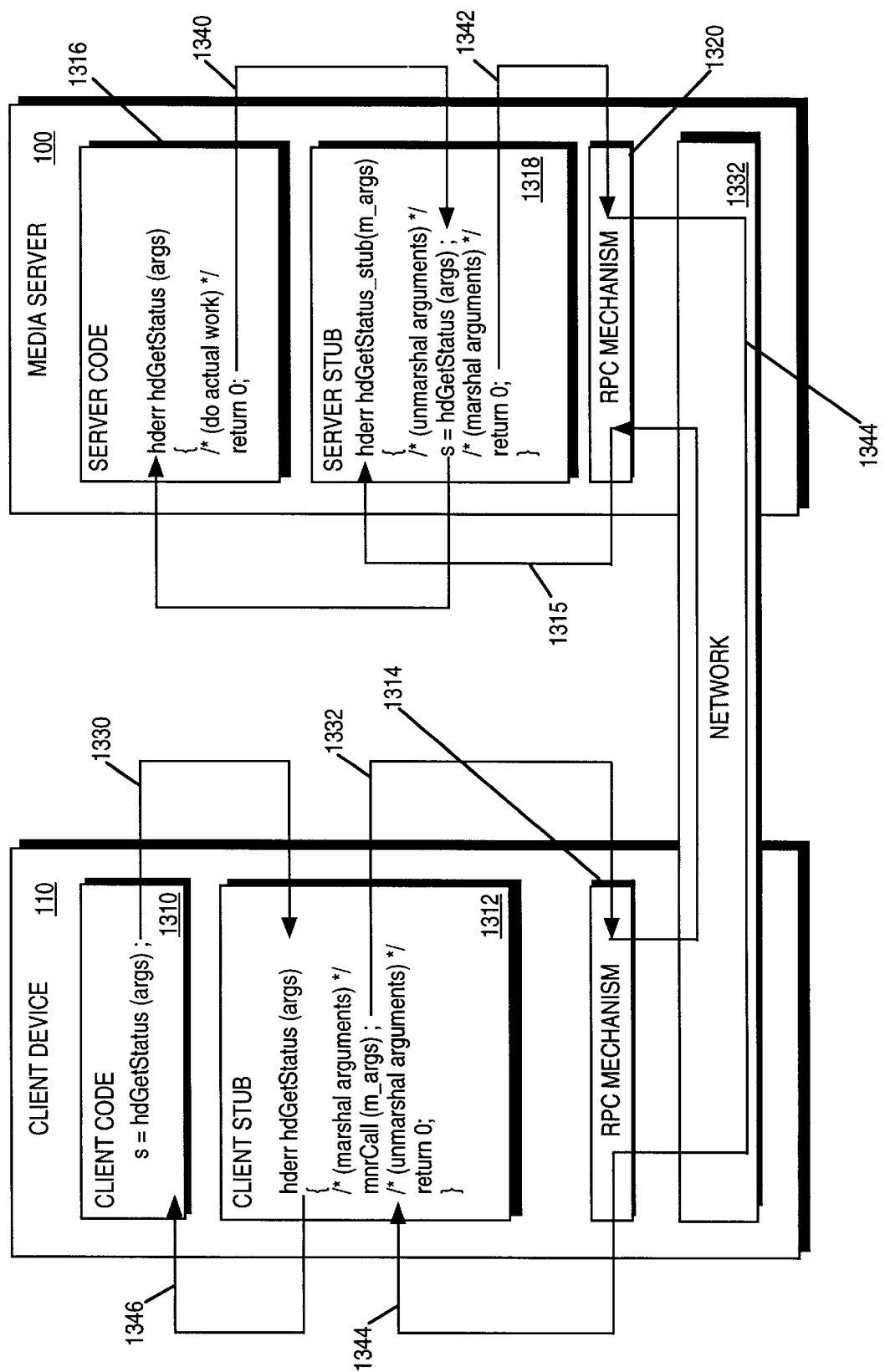
FIG. 16 illustrates the remote procedure call (RPC) operation in the present invention.

Referring now to FIG. 16, the remote procedure call (RPC) mechanism of the present invention is illustrated. Because of the distributed nature of the present invention, client programs cannot be linked directly with the services that they use. Instead, the media server 100 of the present invention uses a remote procedure call (RPC) mechanism to communicate requests from clients to servers and to pass information back. To use the RPC mechanism, the client program is linked with a stub routine, which provides a function-call interface to the service. The stub routines shelter the client and server code from the complexities of machine dependence and logical network transport.

Referring to FIG. 16, an example illustrates the steps performed during the execution of a typical RPC call. These steps are set forth as follows:

Step 1. The client makes a standard function call 1330 to a client stub routine 1312.

Step 2. The client stub routine 1312, 1) marshals data into a machine-independent form, and 2) uses the network protocol 1332 of the present invention to transmit the RPC information to the server stub routine 1318.

Step 3. On the server side, the RPC mechanism invokes the server stub routine 1318 on path 1315.

Step 4. The server stub routine 1318, 1) unmarshals the data, and 2) calls the actual server function 1316 on path 1317. Thus, the server function 1316 is invoked as if it has been called by a local routine in the client. The sequence of events is similar when the server returns data to the client.

Thus, an improved system and method for providing multimedia data in a networked system is disclosed. These specific arrangements and methods described herein are merely illustrative of the principles of this invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. A high bandwidth, scalable server for storing, retrieving, and transporting multimedia data to a client in a networked system, said server comprising:

an upstream manager receiving messages from said client and routing said messages to an appropriate service on said server, said upstream manager being coupled to a first network;

a downstream manager sending a stream of said multimedia data from said appropriate service on said server to said client, said downstream manager being coupled to a second network; and a connection service for maintaining information to connect said client, said upstream manager, said downstream manager, and said appropriate service on said server.

2. The server in claim 1 wherein said connection service further creates a virtual connection between an upstream address and a downstream address for said client.

3. The server in claim 2 wherein said connection service also manages said virtual connection.

4. A computer-implemented method for retrieving and transporting multimedia data between a client and a server on a network, said computer-implemented method comprising the steps of:

receiving a client request for initialization in a message to an upstream manager in said server, said upstream manager being coupled to a first network;

obtaining an upstream physical address for said client as said client request enters said server;

allocating a downstream physical address and downstream logical address to said client corresponding to the upstream physical address obtained for said client, said downstream physical address being used by a downstream manager for sending a stream of said multimedia data from a service on said server to said client, said downstream manager being coupled to a second network; and updating a connection service table with said upstream physical address, said downstream physical address, and said downstream logical address for said client.

5. The computer-implemented method in claim 4 wherein further comprising the steps of:

receiving a service request message from said client to said server via said upstream manager, said service request corresponding to said service on said server, said service request message including said client downstream logical address and a service destination logical address;

generating a response message from said server to said client, said response message including said client downstream logical address; and sending said response message to said client via said downstream manager.

6. The computer-implemented method in claim 4 wherein said step of updating said connection service with said upstream and downstream addresses for said client includes the step of creating a virtual connection between said upstream and downstream addresses for said client.

7. The computer-implemented method in claim 6 wherein said step of creating said virtual connection between said upstream and downstream addresses for said client further includes the step of managing said virtual connection.

8. The computer-implemented method in claim 7 wherein said step of managing said virtual connection includes the steps of:

creating a routing table containing said client downstream logical address and a corresponding client downstream physical address;

accessing said connection service table; and utilizing information in said routing table and said connection service table to route said client service request message from said client to said service in said server and to route said response message from said service in said server to said client via said downstream manager.

9. The computer-implemented method in claim 4 wherein said request for initialization to said upstream manager is a Remote Procedure Call (RPC).

10. A high bandwidth, scalable server for storing, retrieving, and transporting multimedia data to a client in a networked system, said server comprising:

means for receiving a client request for initialization in a message to an upstream manager in said server, said upstream manager being coupled to a first network;

means for obtaining an upstream physical address for said client as said client request enters said server;

means for allocating a downstream physical address and downstream logical address for said client corresponding to the upstream physical address obtained for said client, said downstream physical address being used by a downstream manager for sending a stream of said multimedia data from a service on said server to said client, said downstream manager being coupled to a second network; and means for updating a connection service table with said upstream physical address, said downstream physical address, and said downstream logical address for said client.

11. The server as claimed in claim 10 further including:

means for receiving a service request message from said client via said upstream manager, said service request corresponding to said service on said server, said service request message including said client downstream logical address and a service destination logical address;

means for generating a response message to said client, said response message including said client downstream logical address; and means for sending said response message to said client via said downstream manager.

12. The server as claimed in claim 10 further including:

means for creating and managing a virtual connection between said upstream and downstream addresses for said client.

13. The server as claimed in claim 12 wherein said means for creating and managing said virtual connection further includes:

means for creating a routing table containing said client downstream logical address and a corresponding client downstream physical address;

means for accessing said connection service table; and means for utilizing information in said routing table and said connection service table to route said client service request message from said client to said service in said server and to route said response message from said service in said server to said client via said downstream manager.

14. The server as claimed in claim 10 wherein said means for receiving a client request for initialization further includes a means for receiving a Remote Procedure Call (RPC).

* * * * *

(12) EX PARTE REEXAMINATION CERTIFICATE (7055th)
United States Patent
Laursen et al.

(10) Number: US 5,805,804 C1
(45) Certificate Issued: Sep. 15, 2009

(54) METHOD AND APPARATUS FOR SCALABLE, HIGH BANDWIDTH STORAGE RETRIEVAL AND TRANSPORTATION OF MULTIMEDIA DATA ON A NETWORK

(75) Inventors: Andrew Laursen, San Mateo, CA (US); Jeffrey C. Olkin, Sunnyvale, CA (US); Mark A. Porter, Woodside, CA (US); Farzad Nazem, Redwood City, CA (US); William Bailey, Palo Alto, CA (US); Mark Moore, Foster City, CA (US)

(73) Assignee: Broadband Royalty Corporation, Wilmington, DE (US)

Reexamination Request:
No. 90/008,536, Mar. 22, 2007

Reexamination Certificate for:
Patent No.: 5,805,804
Issued: Sep. 8, 1998
Appl. No.: 08/816,207
Filed: Mar. 12, 1997

Related U.S. Application Data

(63) Continuation of application No. 08/343,762, filed on Nov. 21, 1994, now abandoned.

(51) Int. Cl.
*H04N 5/00* (2006.01)
*H04N 7/173* (2006.01)
*H04L 29/06* (2006.01)

(52) U.S. Cl. .............. 709/223; 348/E5.008; 348/E7.073; 370/397

(58) Field of Classification Search .................. None
See application file for complete search history.

(56) References Cited

U.S. PATENT DOCUMENTS

| | | | |
|---|---|---|---|
| 3,746,780 A | 7/1973 | Stetten et al. | 178/6.6 A |
| 4,590,516 A | 5/1986 | Abraham | 358/86 |
| 5,014,125 A | 5/1991 | Pocock et al. | 358/86 |
| 5,130,792 A | 7/1992 | Tindell et al. | 358/85 |
| 5,150,247 A | 9/1992 | Sharpe et al. | 359/135 |
| 5,247,347 A | 9/1993 | Litteral et al. | 358/85 |
| 5,481,542 A | 1/1996 | Logston et al. | 370/94.2 |
| 5,508,732 A | 4/1996 | Bottomley et al. | 348/7 |
| 5,534,912 A | 7/1996 | Kostreski | 348/6 |
| 5,534,913 A | 7/1996 | Majeti et al. | 348/7 |
| 5,682,325 A | 10/1997 | Lightfoot et al. | 364/514 C |

*Primary Examiner*—Deandra M Hughes

(57) ABSTRACT

An improved system and method for providing multimedia data in a networked system is disclosed. The present invention provides a platform for distributed client-server computing and access to data over asymmetric real-time networks. A service mechanism allows applications to be split such that client devices (set-top boxes, personal digital assistants, etc.) can focus on presentation, while backend services running in a distributed server complex, provide access to data via messaging across an abstracted interface.

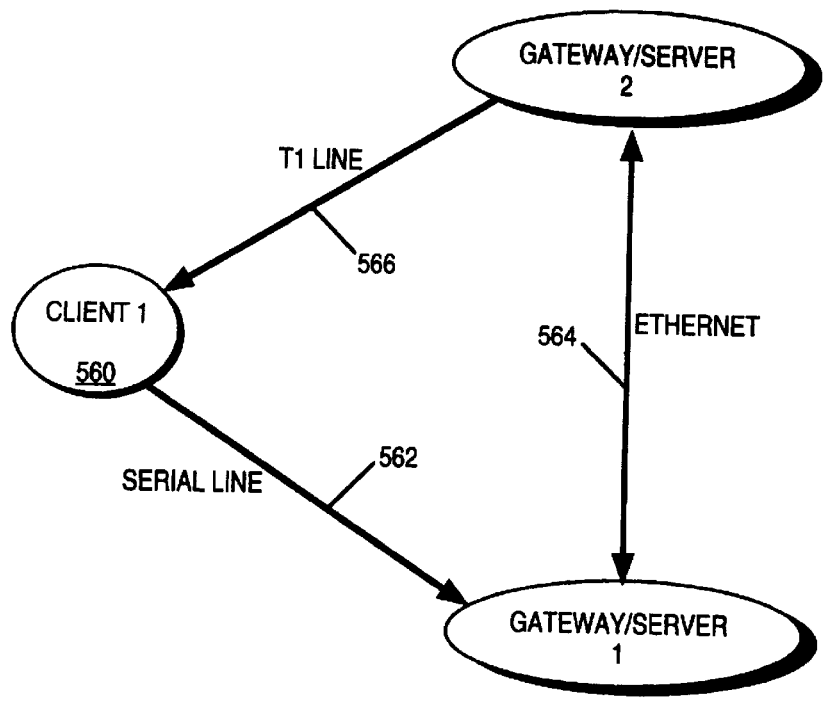

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–14 is confirmed.

Claims 1–3 are cancelled.

New claims 15–19 are added and determined to be patentable.

*15. A high bandwidth, scalable server for storing, retrieving, and transporting multimedia data to a client in a networked system, said server comprising:*
  *an upstream manager receiving messages from said client and routing said messages to an appropriate service on said server, said upstream manager being coupled to a first network;*
  *a downstream manager sending a stream of said multimedia data from said appropriate service on said server to said client, said downstream manager being coupled to a second network and being substantially functionally distinct from the upstream manager;*
  *a connection service for maintaining information to connect said client, said upstream manager, said downstream manager, and said appropriate service on said server, said connection service being substantially functionally distinct from the upstream manager; and*
  *wherein said connection service further creates a virtual connection between an upstream address and a downstream address for said client.*

*16. The server in claim 15 wherein said connection service also manages said virtual connection.*

*17. A high bandwidth, scalable server for storing, retrieving, and transporting multimedia data to a client in a networked system, said server comprising:*
  *an upstream manager receiving messages from said client and routing said messages to an appropriate service on said server, said upstream manager being coupled to a first network;*
  *a downstream manager sending a stream of said multimedia data from said appropriate service on said server to said client, said downstream manager being coupled to a second network;*
  *a connection service for maintaining information to connect said client, said upstream manager, said downstream manager, and said appropriate service on said server; and*
  *the server obtaining an upstream physical address for said client and allocating a downstream logical address for said client corresponding to the upstream physical address obtained for said client.*

*18. The server in claim 17 wherein said connection service further creates a virtual connection to said client using the downstream logical address.*

*19. The server in claim 18 wherein said connection service also manages said virtual connection.*

* * * * *